(12) United States Patent
Klein et al.

(10) Patent No.: US 11,221,157 B2
(45) Date of Patent: Jan. 11, 2022

(54) METHOD AND SYSTEM FOR CONTROLLING A MINI-SPLIT HVAC UNIT FROM A REMOTE LOCATION

(71) Applicants: Ademco Inc., Golden Valley, MN (US); Aaron J. Klein, Rochester, MN (US); Ramprasad Yelchuru, Bangalore (IN); Huanmin Bao, Beijing (CN); Cameron K. Vreeland, Mound, MN (US)

(72) Inventors: Aaron J. Klein, Rochester, MN (US); Ramprasad Yelchuru, Bangalore (IN); Huanmin Bao, Beijing (CN); Cameron K. Vreeland, Mound, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/966,703

(22) PCT Filed: Feb. 1, 2018

(86) PCT No.: PCT/CN2018/074972
§ 371 (c)(1),
(2) Date: Jul. 31, 2020

(87) PCT Pub. No.: WO2019/148429
PCT Pub. Date: Aug. 8, 2019

(65) Prior Publication Data
US 2021/0033298 A1 Feb. 4, 2021

(51) Int. Cl.
*F24F 11/523* (2018.01)
*F24F 11/56* (2018.01)
(Continued)

(52) U.S. Cl.
CPC ............ *F24F 11/523* (2018.01); *F24F 11/56* (2018.01); *F24F 2110/10* (2018.01);
(Continued)

(58) Field of Classification Search
CPC ...... F24F 11/523; F24F 11/56; F24F 2110/20; F24F 2110/10; F24F 11/30; G05B 2219/2614; G05B 15/02
See application file for complete search history.

(56) References Cited

U.S. PATENT DOCUMENTS

D341,848 S 11/1993 Bigelow et al.
5,833,134 A 11/1998 Ho et al.
(Continued)

FOREIGN PATENT DOCUMENTS

CA 2971597 A1 6/2016
CN 103994552 A 8/2014
(Continued)

OTHER PUBLICATIONS

Response to Rules 161(2) and 162 EPC dated Sep. 8, 2020, from European Application No. 18903595.9, filed Jan. 8, 2021, 14 pp.
(Continued)

*Primary Examiner* — Rocio Del Mar Perez-Velez
*Assistant Examiner* — Alicia M. Choi
(74) *Attorney, Agent, or Firm* — Shumaker & Sieffert, P.A.

(57) ABSTRACT

A wireless controller to set a programmable setpoint of a remote HVAC unit that thermostatically controls a temperature in a space using the temperature sensed and a programmable setpoint. The wireless controller may include a transmitter, a memory, a temperature sensor, and a controller. The wireless controller may transmit commands to set the programmable setpoint of the remote HVAC unit, wait until the temperature sensed by the temperature sensor of the wireless controller stabilizes, determine a difference between the desired setpoint temperature and the stabilized temperature, and if the offset temperature is greater than or equal to a threshold offset, determine an updated control setpoint tem-
(Continued)

perature and transmit commands to set the programmable setpoint of the remote HVAC unit to an updated control setpoint temperature.

20 Claims, 26 Drawing Sheets

(51) Int. Cl.
    *F24F 110/20*     (2018.01)
    *F24F 110/10*     (2018.01)
    *G05B 15/02*     (2006.01)

(52) U.S. Cl.
    CPC ........... *F24F 2110/20* (2018.01); *G05B 15/02* (2013.01); *G05B 2219/2614* (2013.01)

(56) References Cited

U.S. PATENT DOCUMENTS

| | | | |
|---|---|---|---|
| D469,107 S | 1/2003 | Miller et al. |
| D506,150 S | 6/2005 | Backlund et al. |
| D506,687 S | 6/2005 | Takach et al. |
| D509,151 S | 9/2005 | Takach et al. |
| D520,386 S | 5/2006 | Takach et al. |
| D535,572 S | 1/2007 | Takach et al. |
| D535,573 S | 1/2007 | Barton et al. |
| D541,184 S | 4/2007 | Barton et al. |
| D542,677 S | 5/2007 | Barton et al. |
| D556,060 S | 11/2007 | McGuire et al. |
| D580,282 S | 11/2008 | Bray et al. |
| D580,801 S | 11/2008 | Takach et al. |
| D590,730 S | 4/2009 | Simard et al. |
| D595,160 S | 6/2009 | Fisher et al. |
| D595,161 S | 6/2009 | Fisher et al. |
| D596,964 S | 7/2009 | Wang et al. |
| D622,621 S | 8/2010 | Choi et al. |
| D639,957 S | 6/2011 | Pauschitz |
| D666,509 S | 9/2012 | Beland et al. |
| D678,084 S | 3/2013 | Beland et al. |
| D712,756 S | 9/2014 | Rump et al. |
| D717,681 S | 11/2014 | Shail et al. |
| D720,633 S | 1/2015 | Novotny et al. |
| 8,950,687 B2 | 2/2015 | Bergman et al. |
| D725,524 S | 3/2015 | Takach et al. |
| D738,755 S | 9/2015 | Druce |
| D738,756 S | 9/2015 | Jiang et al. |
| D743,349 S | 11/2015 | Leeland et al. |
| D744,433 S | 12/2015 | Baumgartner et al. |
| D745,556 S | 12/2015 | Jeon et al. |
| D750,980 S | 3/2016 | Takach et al. |
| D751,426 S | 3/2016 | Edgar |
| D755,132 S | 5/2016 | Kashimoto |
| D758,426 S | 6/2016 | Park et al. |
| D778,244 S | 2/2017 | Feldstein et al. |
| D778,245 S | 2/2017 | Feldstein et al. |
| D792,789 S | 7/2017 | Read et al. |
| D795,712 S | 8/2017 | Bergin et al. |
| D797,580 S | 9/2017 | Read et al. |
| D801,345 S | 10/2017 | Kujawski et al. |
| D803,705 S | 11/2017 | Read et al. |
| D808,828 S | 1/2018 | Behar et al. |
| D809,942 S | 2/2018 | Cool |
| D811,245 S | 2/2018 | Combe |
| 9,955,244 B2 | 4/2018 | Rothkopf |
| D820,121 S | 6/2018 | Combe et al. |
| 10,018,372 B2 | 7/2018 | Lemire et al. |
| D824,786 S | 8/2018 | Combe et al. |
| D830,861 S | 10/2018 | McNealy et al. |
| D832,722 S | 11/2018 | Farenski |
| D837,666 S | 1/2019 | Butler et al. |
| D843,240 S | 3/2019 | Combe |
| D844,015 S | 3/2019 | Meng |
| D866,580 S | 11/2019 | Mazz et al. |
| D867,601 S | 11/2019 | Henry et al. |
| D871,933 S | 1/2020 | Zhang |
| D875,110 S | 2/2020 | Spors et al. |
| D890,108 S | 7/2020 | Seo et al. |
| 2003/0056946 A1* | 3/2003 | Breeden ............ G05D 23/1951 165/238 |
| 2004/0064203 A1* | 4/2004 | Bornside ................. G05B 7/02 700/78 |
| 2009/0140059 A1 | 6/2009 | Barton et al. |
| 2012/0067560 A1 | 3/2012 | Bergman et al. |
| 2014/0316584 A1* | 10/2014 | Matsuoka ............... F24F 11/62 700/278 |
| 2014/0329450 A1* | 11/2014 | Hoke ................. B60H 1/00785 454/75 |
| 2014/0358294 A1* | 12/2014 | Nichols .................... F24F 11/30 700/278 |
| 2015/0127176 A1 | 5/2015 | Bergman et al. |
| 2015/0148965 A1* | 5/2015 | Lemire .................... F24F 11/62 700/276 |
| 2016/0061472 A1* | 3/2016 | Lee ........................ G05B 15/02 700/276 |
| 2016/0349823 A1 | 12/2016 | Killo et al. |
| 2018/0023838 A1 | 1/2018 | Tucker |
| 2018/0225934 A1 | 8/2018 | Moulton et al. |
| 2018/0356111 A1* | 12/2018 | Salsbury ................. F24F 11/30 |
| 2019/0141179 A1 | 5/2019 | Dushane et al. |

FOREIGN PATENT DOCUMENTS

| | | |
|---|---|---|
| CN | 105387557 A | 3/2016 |
| CN | 107062539 A | 8/2017 |
| CN | 206489622 U | 9/2017 |
| EP | 2781852 A1 | 9/2014 |
| EP | 3242353 A1 | 11/2017 |
| GB | 2252850 A | 8/1992 |

OTHER PUBLICATIONS

Notice of Intent to Grant, and English translation thereof, from counterpart Chinese Application No. 201830113930.7, dated Feb. 21, 2019, 5 pp.

Communication pursuant to Rules 161(2) and 162 EPC from counterpart European Application No. 18903595.9, dated Sep. 8, 2020, 3 pp.

International Search Report and Written Opinion of International Application No. PCT/CN2018/074972, dated Jun. 5, 2018, 7 pp.

Prosecution History from U.S. Appl. No. 29/664,633, dated Mar. 19, 2020 through Aug. 14, 2020, 45 pp.

Prosecution History from U.S. Appl. No. 29/658,438, dated Aug. 30, 2018 through Oct. 18, 2019, 39 pp.

U.S. Appl. No. 29/757,755, filed Nov. 9, 2020, naming inventors Zhang et al.

Extended Search Report from counterpart European Application No. 18903595.9, dated Sep. 15, 2021, 9 pp.

\* cited by examiner

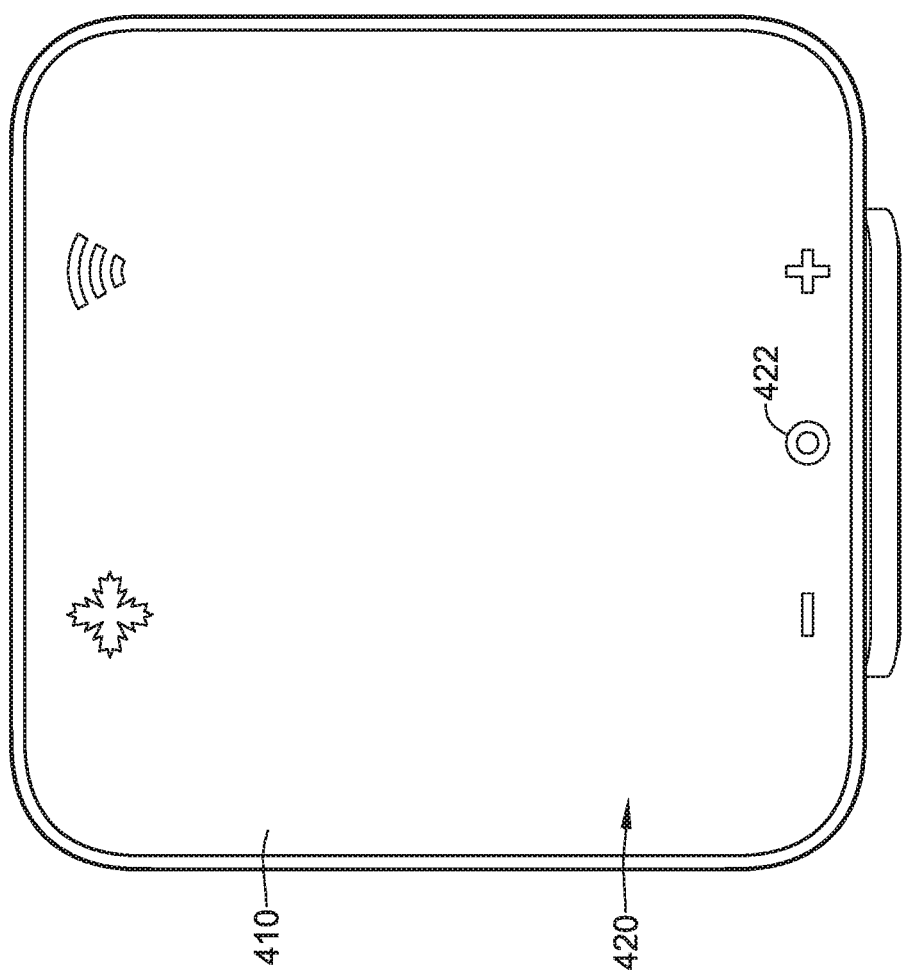

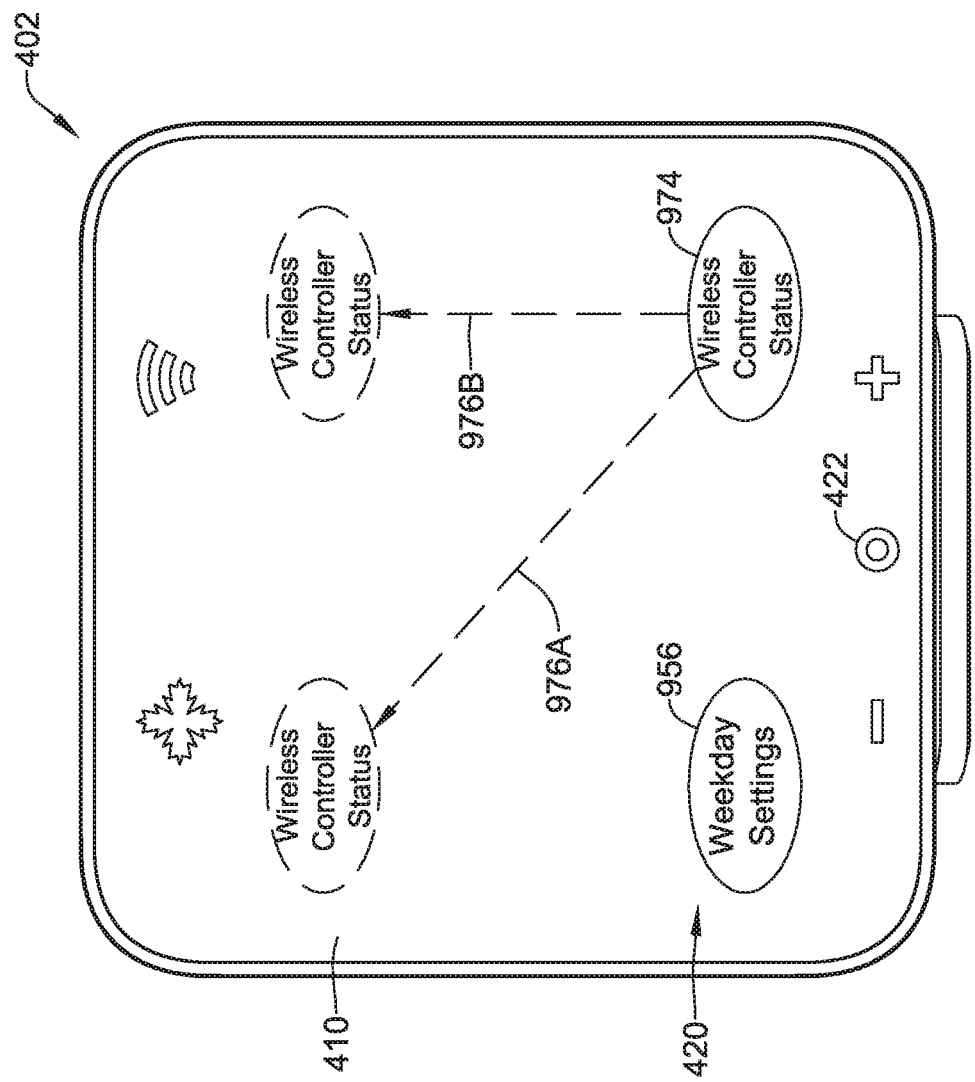

METHOD AND SYSTEM FOR CONTROLLING A MINI-SPLIT HVAC UNIT FROM A REMOTE LOCATION

TECHNICAL FIELD

The disclosure relates generally to building automation systems, and more particularly to remote wireless controllers for such building automation systems.

BACKGROUND

Building automation systems can include systems such as a Heating, Ventilation and/or Air Conditioning (HVAC) systems, security/access control systems, lighting systems, fire alarm and/or suppression systems and/or other building control systems. HVAC systems are commonly used to control the comfort level within a building or other structure. There are various types of HVAC systems that are in use today. Some HVAC systems affect conditions in multiple rooms of a building with a centralized source of heated or cooled air (e.g., central furnace, air conditioner and/or air handler) and a network of ducts, dampers, etc., to manage airflow throughout the building. Other HVAC systems are more limited in extent, such as self-contained window air conditioner. Some HVAC systems, such as mini-split HVAC systems, include an indoor unit that circulates cooled and/or heated air in a particular room or region of the building, often with limited or no ducts running through the building. In many cases, such mini-split HVAC systems often extend outside of the building, often through a hole in an outer wall of the building. Such mini-split HVAC systems are often mounted high in a room, toward the ceiling.

Many HVAC systems include a controller that activates and deactivates components of the HVAC system to affect and control one or more environmental conditions within the building These environmental conditions can include, but are not limited to, temperature, humidity, and/or ventilation. In many cases, such HVAC controllers may include, or have access to, one or more sensors, and may use parameters provided by the one or more sensors to control the one or more HVAC components to achieve the desired programmed or set environmental conditions within the building. In some cases, the HVAC controller and/or sensors are housed in the HVAC system itself, such as in a self-contained window air conditioner and/or in some mini-split HVAC systems. When so provided, a wireless remote control device is often provided to allow the user to remotely change the temperature setpoint and/or other parameters of the HVAC controller. Such wireless remote control devices may be especially common for those mini-split HVAC systems that are mounted high in a room and toward the ceiling, and thus the controls of which may not be readily reachable by the user.

When the sensors are housed in or around the HVAC system, such as in some mini-split HVAC systems, the sensed temperature may not represent the temperature that is experienced by the user, especially when the mini-split HVAC system is mounted high in a room where the temperature of the air is generally warmer. What would be desirable is an improved method and system for controlling a mini-split HVAC system to deliver improved comfort to the user.

SUMMARY

This disclosure relates generally to building automation systems, and more particularly to remote wireless controllers for such building automation systems. In one example, a wireless controller may be configured to set a programmable setpoint of a remote HVAC unit, wherein the remote HVAC unit is configured to thermostatically control a temperature in a space based at least in part on a temperature sensed by a local temperature sensor of the remote HVAC unit and the programmable setpoint. The wireless controller may include a transmitter configured to wirelessly transmit one or more commands to set the programmable setpoint of the remote HVAC unit, a memory for storing a desired setpoint temperature, a temperature sensor for sensing a temperature at the wireless controller, and a controller operatively coupled to the transmitter, the temperature sensor, and the memory. The controller may be configured to: transmit one or more commands via the transmitter to set the programmable setpoint of the remote HVAC unit to the desired setpoint temperature; wait until the temperature sensed by the temperature sensor of the wireless controller stabilizes at a stabilized temperature; determine a difference between the desired setpoint temperature and the stabilized temperature, resulting in an offset temperature; if the offset temperature is greater than or equal to a threshold offset, then: determine an updated control temperature setpoint based on the offset temperature and the desired setpoint temperature; and transmit one or more commands to set the programmable setpoint of the remote HVAC unit to the updated control temperature setpoint.

Alternatively or additionally to the foregoing, the controller may be configured to determine the updated control setpoint temperature by adding the offset temperature to the desired setpoint temperature.

Alternatively or additionally to any of the embodiments above, the controller may be configured to determine that the temperature sensed by the temperature sensor of the wireless controller has stabilized by determining when a change rate in the temperature sensed by the temperature sensor of the wireless controller falls below a change rate threshold.

Alternatively or additionally to any of the embodiments above, the wireless controller may include a user interface that may include a display, and the controller may be configured to display on the display the desired setpoint temperature even after the controller transmits one or more commands to set the programmable setpoint of the remote HVAC unit to the updated control setpoint temperature.

Alternatively or additionally to any of the embodiments above, the wireless controller may include a user interface that has a display, wherein a user can enter and/or change the desired setpoint temperature via the user interface.

Alternatively or additionally to any of the embodiments above, it is contemplated that the controller may be configured to: wait at least a sample period before the controller again waits until the temperature sensed by the temperature sensor of the wireless controller stabilizes at a stabilized temperature, determine a difference between the desired setpoint temperature and the stabilized temperature, resulting in an offset temperature; if the offset temperature is greater than or equal to a threshold offset, then determine an updated control setpoint temperature based on the offset temperature and the desired setpoint temperature; and transmit one or more commands to set the programmable setpoint of the remote HVAC unit to the updated control setpoint temperature. It is contemplated that the sample period may be at least 5 minutes, at least 10 minutes, at least 20 minutes, at least 30 minutes, at least 60 minutes, or any other suitable time period.

Alternatively or additionally to any of the embodiments above, after the controller transmits one or more commands to set the programmable setpoint of the remote HVAC unit to the updated control setpoint temperature, the controller may be configured to: wait until the temperature sensed by the temperature sensor of the wireless controller stabilizes at a new stabilized temperature; determine a difference between the desired setpoint temperature and the new stabilized temperature, resulting in a new offset temperature; if the new offset temperature is greater than or equal to the threshold offset, then determine an updated control setpoint temperature by adding the new offset temperature to the previous updated control setpoint temperature; and transmit one or more commands to set the programmable setpoint of the remote HVAC unit to the updated control setpoint temperature.

Alternatively or additionally to any of the embodiments above, the remote HVAC unit may comprise a mini-split HVAC unit that may include an infra-red (IR) receiver that is configured to receive one or more commands to set the programmable setpoint of the mini-split HVAC unit, and wherein the transmitter of the wireless controller may include an IR transmitter for transmitting one or more commands to set the programmable setpoint of the mini-split HVAC unit.

Alternatively or additionally to any of the embodiments above, the memory may store a programmable schedule that may include a plurality of desired setpoint temperatures each associated with a corresponding time, and the controller may be configured to transmit one or more commands to set the programmable setpoint of the remote HVAC unit to each of the desired setpoint temperatures plus an offset temperature at the corresponding times.

In another example of the disclosure, a wireless temperature controller may be configured to set a programmable setpoint of a mini-split HVAC unit that may include an infra-red (IR) receiver that may be configured to receive one or more commands to set the programmable setpoint of the mini-split HVAC unit. The mini-split HVAC unit may be configured to thermostatically control a temperature in a space based at least in part on a temperature sensed by a temperature sensor associated with the mini-split HVAC unit and the programmable setpoint. The wireless temperature controller may include an IR transmitter that is configured to wirelessly transmit one or more commands to set the programmable setpoint of the mini-split HVAC unit, a memory for storing a desired setpoint temperature, a temperature sensor for sensing a temperature at the wireless temperature controller, and a controller operatively coupled to the IR transmitter, the temperature sensor, and the memory. In some cases, the controller may be configured to transmit one or more commands via the IR transmitter to set the programmable setpoint of the mini-split HVAC unit to the desired setpoint temperature, wait until the temperature sensed by the temperature sensor of the wireless temperature controller stabilizes at a stabilized temperature, determine a difference between the desired setpoint temperature and the stabilized temperature, resulting in an offset temperature, determine an updated control setpoint temperature based at least in part on the offset temperature and the desired setpoint temperature, and transmit one or more commands via the IR transmitter to set the programmable setpoint of the mini-split HVAC unit to the updated control setpoint temperature.

Alternatively or additionally to any of the embodiments above, the controller may be configured to determine if the offset temperature is greater than or equal to a threshold offset, and if not, skip both of the following: determining the updated control setpoint temperature based on the offset temperature and the desired setpoint temperature; and transmit one or more commands via the IR transmitter to set the programmable setpoint of the mini-split HVAC unit to the updated control setpoint temperature.

Alternatively or additionally to any of the embodiments above, the controller may be configured to: wait at least a sample period before the controller again waits until the temperature sensed by the temperature sensor of the wireless temperature controller stabilizes at a stabilized temperature; determine a difference between the desired setpoint temperature and the stabilized temperature, resulting in an offset temperature; determine an updated control setpoint temperature based on the offset temperature and the desired setpoint temperature; and transmit one or more commands via the IR transmitter to set the programmable setpoint of the mini-split HVAC unit to the updated control setpoint temperature. It is contemplated that the sample period may be at least 5 minutes, at least 10 minutes, at least 20 minutes, at least 30 minutes, at least 60 minutes, or any other suitable time period.

In another example of the disclosure, a method for controlling a mini-split HVAC unit from a remote location may include sending one or more commands from the remote location to set the programmable setpoint of the mini-split HVAC unit to a desired setpoint temperature, sensing a temperature at the remote location, waiting until the temperature sensed at the remote location stabilizes at a stabilized temperature, determining a difference between the desired setpoint temperature and the stabilized temperature, resulting in an offset temperature, determining an updated control setpoint temperature based on the offset temperature and the desired setpoint temperature, and sending one or more commands from the remote location to set the programmable setpoint of the mini-split HVAC unit to the updated control setpoint temperature.

Alternatively or additionally to any of the embodiments above, the method may comprise determining if the offset temperature is greater than or equal to a threshold offset, and if not, skipping both: determining the updated control setpoint temperature based on the offset temperature and the desired setpoint temperature; and sending one or more commands to set the programmable setpoint of the mini-split HVAC unit to the updated control setpoint temperature.

Alternatively or additionally to any of the embodiments above, the method may further comprise waiting at least a sample period, and then waiting until the temperature sensed at the remote location stabilizes at a stabilized temperature, determining a difference between the desired setpoint temperature and the stabilized temperature, resulting in an offset temperature, determining an updated control setpoint temperature based on the offset temperature and the desired setpoint temperature, and sending one or more commands from the remote location to set the programmable setpoint of the mini-split HVAC unit to the updated control setpoint temperature. The step of waiting until the temperature sensed at the remote location stabilizes at a stabilized temperature may simply be a confirmation step that the temperature sensed at the remote location is a stabilized temperature. It is contemplated that the sample period may be at least 5 minutes, at least 10 minutes, at least 20 minutes, at least 30 minutes, at least 60 minutes, or any other suitable time period. In some instances, these steps may be performed by a wireless temperature controller located at the remote location.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which:

FIGS. 5A-5D are schematic views of illustrative screens displayed on the wireless controller of FIG. 3;

FIGS. 9A-9K are schematic views of illustrative screens displayed on the wireless controller of FIG. 3.

Figure 1:
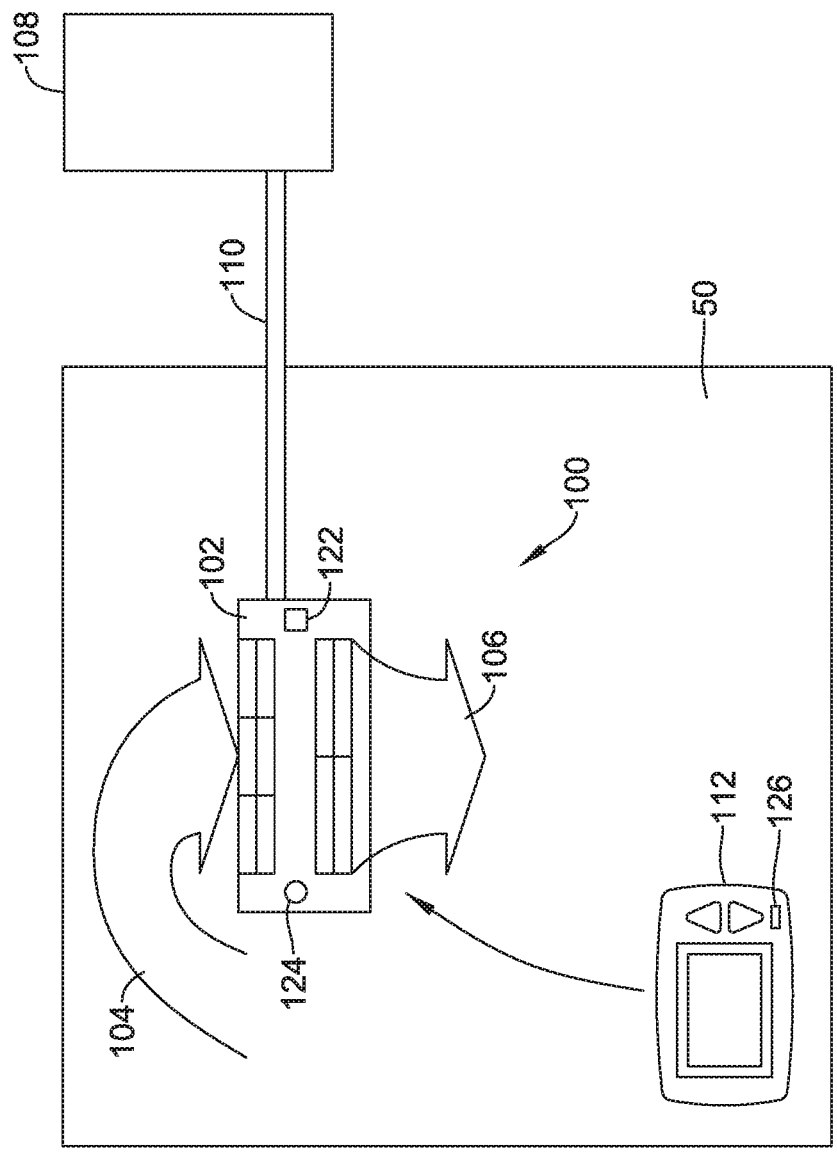
FIG. 1 is a schematic block diagram of an illustrative HVAC unit.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure. Although examples of construction, dimensions, and materials may be illustrated for the various elements, those skilled in the art will recognize that many of the examples provided have suitable alternatives that may be utilized.

FIG. 1 is a schematic block diagram showing features of an illustrative HVAC unit 100 that may thermostatically control a temperature of a space 50. The HVAC unit 100 is shown in FIG. 1 as often referred to as a mini-split HVAC unit, but it is contemplated that the disclosure is not limited to such HVAC units. For example, it is contemplated that the HVAC unit 100 may be a window air conditioning unit, a central air conditioning unit, a forced-air central heating unit, or any other suitable HVAC unit. Moreover, it is contemplated that various embodiments and examples described herein may be extended to other building automation systems and/or units including, but not limited to, security system units, lighting system units, etc.

The illustrative HVAC unit 100 of FIG. 1 includes an indoor unit 102 that may be configured to draw in return air 104 and supply temperature regulated air 106 to the space 50. The indoor unit 102 may be configured to handle air 104 and 106 with or without a network of ductwork installed within and/or around the space 50.

The indoor unit 102 of the HVAC unit 100 may be connected to an outdoor unit 108, sometimes through a hole in an external wall of the building. In some cases, lines 110 carrying a working fluid may be transferred between the indoor unit 102 and the outdoor unit 108. Outdoor unit 108 may be exposed to an outdoor space, although this is not necessary in all instances. In some cases, outdoor unit 108 may be mechanically connected to the indoor unit 102. The outdoor unit 108 may extend through a hole in an external wall of the building to access the outdoor space. Alternatively, the outdoor unit 108 may be located remote from the indoor unit 102 and may be operatively connected by lines 110 carrying a working fluid and/or by one or more ducts. In some cases, the HVAC unit 100 may have a cooling mode and/or a heating mode for controlling the temperature of air inside of the building. In some instances, such as when the HVAC unit is a mini-split HVAC system, the HVAC unit 100 may be mounted high in a room, toward the ceiling.

In some cases, the HVAC unit 100 may be in communication with a wireless controller 112, which may be located remotely from the HVAC unit 100. When so provided, the wireless controller 112 may be configured to communicate wirelessly with an onboard controller 122 of the HVAC unit 100, and the onboard controller 122 may be configured to accept input signals, such as infra-red (IR) signals (IR codes), from the remotely located wireless controller 112. In some instances, the wireless controller 112 may communicate with the onboard controller 122 of the HVAC unit 100 any suitable communication path, such as via a wired (Ethernet, USB, RS-232, etc.) and/or a wireless (Wifi, Bluetooth, Zigbee, etc.) communication link. Communication between the wireless controller 112 and the onboard controller 122 of the HVAC unit 100 may be unidirectional (e.g. from the wireless controller 112 to HVAC unit 100) or bidirectional, as desired.

In some cases, the HVAC unit 100 may include an IR receiver that is configured to receive IR signals from the wireless controller 112, and then pass those IR signals to the onboard controller 122. Such IR signal may represent commands that are sent to the HVAC unit 100 from the wireless controller 112, such as to change a setpoint temperature, change a mode (heat, cool) of the HVAC unit 100, etc.

In some cases, the wireless controller 112 may store various IR protocols, along with a correspondence between the various IR protocols and different makes/models of HVAC units. When so provided, the user may use the wireless controller 112 to select a particular make/model that corresponds to their HVAC unit, and the wireless controller 112 may then look up and use the IR protocol that corresponds to the selected make/model when subsequently communicating with the user's HVAC unit 100. In this way, the wireless controller 112 may be considered a universal wireless controller 112 that can communicate with a variety of makes/models of HVAC units, without having to access a remote database such as a remote IR protocol database in the cloud. This may be particularly useful when the wireless controller 112 does not currently have access to the cloud.

It is contemplated that the onboard controller 122 may be configured to control at least parts of the HVAC unit 100, as described further herein. In some cases, the HVAC unit 100 may also include a local temperature sensor 124. The onboard controller 122 may reference the temperature sensed by the local temperature sensor 124 and control whether the HVAC unit 100 is in a cooling mode, a heating mode, and/or whether the HVAC unit 100 is currently activated or not. More particularly, the onboard controller 122 may thermostatically control the temperature in the space 50 based on the temperature sensed by the local temperature sensor 124 and a programmable setpoint.

When the temperature sensor 124 of the HVAC unit 100 is housed in or around the indoor unit 102, such as in some mini-split HVAC systems, the sensed temperature may not represent the temperature that is experienced by the user in the space 50, especially when the mini-split HVAC system is mounted high in a room where the temperature of the air is generally warmer. In some cases, and as further detailed herein, the wireless controller 112 may include its own temperature sensor 126, and the wireless controller 112 may use the temperature sensed its own temperature sensor 126 to adjust or alter the programmable temperature setpoint of the HVAC unit 100 in order to deliver improved comfort to the user.

Figure 2:
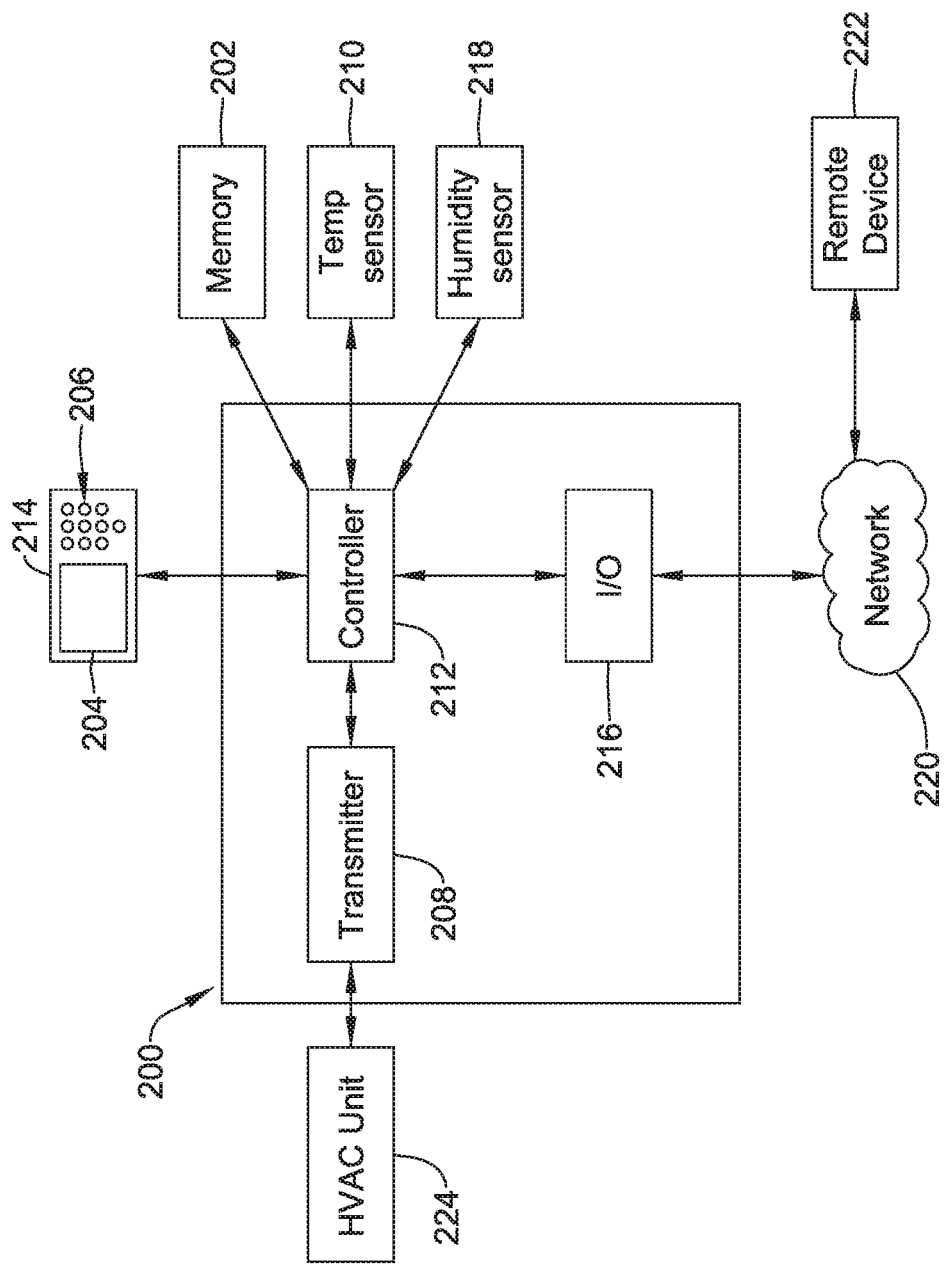
FIG. 2 is a schematic block diagram of an illustrative wireless controller.

FIG. 2 is a schematic block diagram of an illustrative wireless controller 200, which may be the same or similar to the wireless controller 200 of FIG. 1. The wireless controller 200 may include a controller 212 (e.g., microcontroller, microprocessor, etc.) operatively coupled to a memory 202, a user interface 214, transmitter 208 (sometimes a transceiver), a temperature sensor 210, a humidity sensor 218, and an I/0 port 216. The temperature sensor(s) (e.g., temperature sensor 210), humidity sensor(s) (e.g., humidity sensor 218), and/or occupancy sensor(s) may be located in the housing of the wireless controller 200 and/or located remotely from the wireless controller 200.

The transmitter 208 may be configured to communicate using one or more wireless communication protocols, such as cellular communication, ZigBee, REDLINK™, Bluetooth, Wi-Fi, IrDA, infra-red (IR), dedicated short range communication (DSRC), EnOcean, and/or any other suitable common or proprietary wireless protocol, as desired. In some cases, the transmitter 208 may communicate commands from the wireless controller 200 to a remotely located HVAC unit 224 via an IR communication protocol that uses particular IR codes. The HVAC unit 100 may receive the IR codes from the transmitter 208, and when appropriate, execute the received commands. Commands that may be sent to the HVAC unit 224 from the wireless controller 200 may include, for example, a command to change a setpoint temperature of the HVAC unit 224, change a mode (heat, cool) of the HVAC unit 224, etc.

In some instances, the controller 212 may include a pre-programmed chip, such as a very-large-scale integration (VLSI) chip and/or an application specific integrated circuit (ASIC). In such embodiments, the chip may be pre-programmed with control logic in order to control the operation of the wireless controller 200. In some cases, the pre-programmed chip may implement a state machine that performs the desired functions. By using a pre-programmed chip, the controller 212 may use less power than other programmable circuits (e.g. general purpose programmable microprocessors) while still being able to maintain basic functionality. In other instances, the controller 212 may include a programmable microprocessor. Such a programmable microprocessor may allow a user to modify the control logic of the wireless controller 200 even after it is installed in the field (e.g. firmware update), which may allow for greater flexibility of the wireless controller 200 in the field over using a pre-programmed ASIC.

In some cases, the controller 212 may cause the wireless controller 200 to operate in accordance with programmable setpoints. In some cases, the programmable setpoints may correspond to comfort setpoint, such as a temperature setpoint, a humidity setpoint, etc. The programmable setpoints may be modified by a user to suit the user's particular comfort level and/or schedule.

In the example shown in FIG. 2, the user interface 214 is operatively coupled to the controller 212, and permits the wireless controller 200 to display and/or solicit information, such as operational parameters, as well as accept one or more user interactions with the wireless controller 200. Through the user interface 214, the user may, for example, view and manage the operation of one or more HVAC units (e.g., HVAC unit 100, etc.) that service a space, such as a space within a building, house, or structure. In some cases, the user may be able to group one or more HVAC units to form an operating group to establish operating zones within the building, home, or structure. Alternatively, or in addition, the user may be able to set or modify programmable setpoints and/or set or modify an operating schedule for an HVAC unit and/or a group of HVAC units. Different programmable setpoints and/or operating schedules may be selected for different HVAC units and/or groups of HVAC units, if desired. When provided, the ability to view and manage multiple HVAC units servicing a space may facilitate improved management of a building, house, or structure.

In some cases, the user interface 214 may be a physical user interface that is accessible at the wireless controller 200 and may include a display 204 and/or a distinct keypad 206. The display 204 may be any suitable display. In some instances, the display 204 may include or may be a liquid crystal display (LCD), an OLED, etc., and in some cases a fixed segment display, a dot matrix LCD display, a 7-segment type display, and/or may include one or more LEDs. In some cases, the display 204 may include a touch screen LCD panel that functions as both the display 204 and keypad 206. The user interface 214 may be adapted to solicit values for a number of operating parameters, programmable setpoints, and/or to receive such values, but this is not required. In some cases, the user interface 214 may be provided as a separate unit from the wireless controller 200, and may facilitate a user's interactions with the wireless controller 200 located within the building, house, or structure. For example, the user interface 214 may be provided as part of a remote device (e.g., remote device 222), such as a smart phone, a tablet computer, a laptop computer, or a desktop computer. In some cases, the user interface 214 may communicate with the wireless controller 200 via a network such as, for example, a network 220 (e.g. Internet, Wifi, etc.).

In some cases, the user interface 214 may be configured with a shortcut button. In some cases, the distinct keypad 206 may include the shortcut button. In other cases, the display 204 may be a touch screen display and may be programmed to include the shortcut button. In cases where the user interface 214 is provided by a remote device 222, the remote device 222 may provide the shortcut button. When a shortcut button is provided, the wireless controller 200 may assign a function or a sequence of functions to the shortcut button. When so provided, a user may simply actuate the shortcut button from the keypad 206, and in response the controller 212 may execute the assigned function(s).

The assigned functions may be functions that are otherwise available in the menu structure of the controller 212, but the shortcut button may make the assigned function(s) more readily accessible to the user. In some cases, the controller 212 may present one or more menu screens that allow the user to select one or more functions from a plurality of available functions. The selected function(s) may then be assigned to the shortcut button. In some cases, the controller 212 may allow a user to select two or more functions, as well as an order of execution of the two or more functions. Once one or more functions are assigned, the user may use the keypad 206 to activate the shortcut button, and the wireless controller 200 may transmit command signals to an HVAC unit (e.g., HVAC unit 100) to carry out the one or more function(s) assigned to the shortcut button. In some cases, two or more different shortcut buttons may be provided, where the user may assign different function or function combinations to each of the shortcut buttons.

The memory 202 of the wireless remote 200 may be operatively coupled to the controller 212 and may be used to store any desired information, such as the aforementioned control algorithm, setpoints, IR codes, an IR database, schedule times, zones and groupings of HVAC units, shortcut button functional assignments, and the like. The memory 202 may be any suitable type of storage device including, but not limited to, RAM, ROM, EPROM, flash memory (e.g., NAND flash memory), an external SPI flash memory, a hard drive, and/or the like. In some cases, the memory 202 may include two or more types of memory. For example, the memory 202 may include a RAM, a ROM and a flash memory module. During operation, the controller 212 may store information within the memory 202, and may subsequently retrieve the stored information from the memory 202.

In certain embodiments, the HVAC unit 224 or an onboard controller of the HVAC unit 224 may include an IR receiver, and the transmitter 208 may communicate with the HVAC unit through IR signals. In some cases, the memory 202 of the wireless controller 200 may include a NAND flash memory that stores an IR database. In some cases, the IR database may include a lookup table that identifies a plurality of HVAC units and corresponding IR protocols. For example, some HVAC units may use a first IR protocol that has a first set of IR codes, and some HVAC units may use a second IR protocol that has a second set of IR codes. The NAND flash memory may store IR protocols, including the corresponding IR codes, for many different HVAC units that are available on the market. This may allow the wireless remote 200 to communicate with many different HVAC unit once deployed in the field. During setup, the wireless controller 200 may receive a selection of a particular HVAC unit 224 (e.g. brand/model) from a user via the user interface 214. The controller 212 may then identify the particular HVAC unit 224 in the IR database lookup table and identify the IR protocol that corresponds to the user's HVAC unit 224. The wireless remote 200 may then subsequently communicate with the HVAC unit 224 using the identified IR protocol.

While IR communication is used as one example, it is contemplated that the wireless controller 200 may communicate with the HVAC unit 224 using any suitable communication modality. For example, it is contemplated that the transmitter 208 may transmit signals to the onboard controller of the HVAC unit 224 using any suitable wireless and/or wired communication protocol. In some cases, the transmitter 208 may use an ad-hoc wireless network. In other cases, the transmitter 208 may utilize a wireless mesh network and more particularly, a ZigBee wireless or other mesh network. If the transmitter 208 does utilize a mesh network, the onboard controller may serve as the end node(s). In some cases, the transmitter 208 may utilize one or more wireless communication protocols including, but not limited to, cellular communication, ZigBee, RED-LINK™, Bluetooth, Wi-Fi, IrDA, infra-red (IR), dedicated short range communication (DSRC), EnOcean, and/or any other suitable common or proprietary wireless protocol, as desired.

Once the wireless controller 200 has established communication the HVAC unit 224, the wireless controller 200 may send instructions via IR (or other) commands to the HVAC unit 224. For example, as discussed herein, in some cases, the wireless controller 200 may be programmed with a control algorithm that uses programmable setpoints, such as setpoints temperatures and humidity setpoints, to help control the operation of the HVAC unit 224. Accordingly, the wireless controller 200 may receive the programed setpoints (e.g., the setpoint temperature) and/or setpoint schedule from a user via the user interface 214. The controller 212 may then instruct the transmitter 208 to send IR (or other) command signals in accordance with the identified IR protocol to the HVAC unit 224 that instruct the HVAC unit 224 to set the temperature in the space at the desired setpoint temperature.

In some cases, the HVAC unit 224 may include its own temperature sensor for determining the temperature in the space. The HVAC unit 224 may be configured to thermostatically control the temperature in a space based on the temperature sensed by its own temperature sensor. For some mini-split HVAC systems that are mounted high in a room and toward the ceiling, the temperature sensed by the temperature sensor of the HVAC unit 224 may not accurately reflect the temperature experienced by the user. Typically, it will measure a temperature that is warmer than what the user is experiencing, and thus the user may feel cold.

The temperature sensed by the temperature sensor 210 of the wireless controller 200 may be more representative of the temperature experienced by the user. Therefore, the control algorithm of the wireless controller may cause the wireless controller 200 to send IR command signals to the HVAC unit 224 to adjust the temperature setpoint used by the HVAC unit 224 so that the HVAC unit 224 thermostatically controls the temperature in the space, using its own temperature sensor, such that the temperature experienced by the user is more in line with the desired temperature setpoint.

In some instances, the I/O port 216 of the wireless controller 200 may permit the wireless controller 200 to communicate over one or more additional wired or wireless networks that may accommodate remote access and/or control of the wireless controller 200 via a remote device 222 such as, for example, a smart phone, tablet computer, laptop computer, personal computer, PDA, and/or the like. In some cases, the remote device 222 may provide a primary and/or a secondary user interface for the user to interact with the wireless controller 200. In some cases, the wireless controller 200 may utilize a wireless protocol to communicate with the remote device 222 over a network 220. In some cases, the network 220 may be a may be a Local Area Network (LAN) such as a Wi-Fi network or a Wide Area Network (WAN) such as the Internet. These are just some examples.

In some cases, the remote device 222 may execute an application program that facilitates communication and control of the wireless controller 200. The application program may be provided by and downloaded from an external web service (e.g. Apple Inc.'s ITUNES®, Google Inc.'s Google Play, a proprietary server, etc.) for this purpose, but this is not required. In one example, the application program may cause the remote device 222 to receive and store data, such as programmable setpoints, operational parameters, operating schedules, etc. received from the wireless controller 200. The application program may translate the data received from the wireless controller 200 and display the data to the user via the user interface of the remote device 222. Additionally, the application program may be capable of accepting an input from a user through the user interface of the remote device 222 and transmitting accepted input to the wireless controller 200. For example, if the user inputs include setpoint temperature changes, humidity setpoint changes, schedule changes, and/or other changes, the application program may transmit these changes to the remote device 222.

Figure 3:
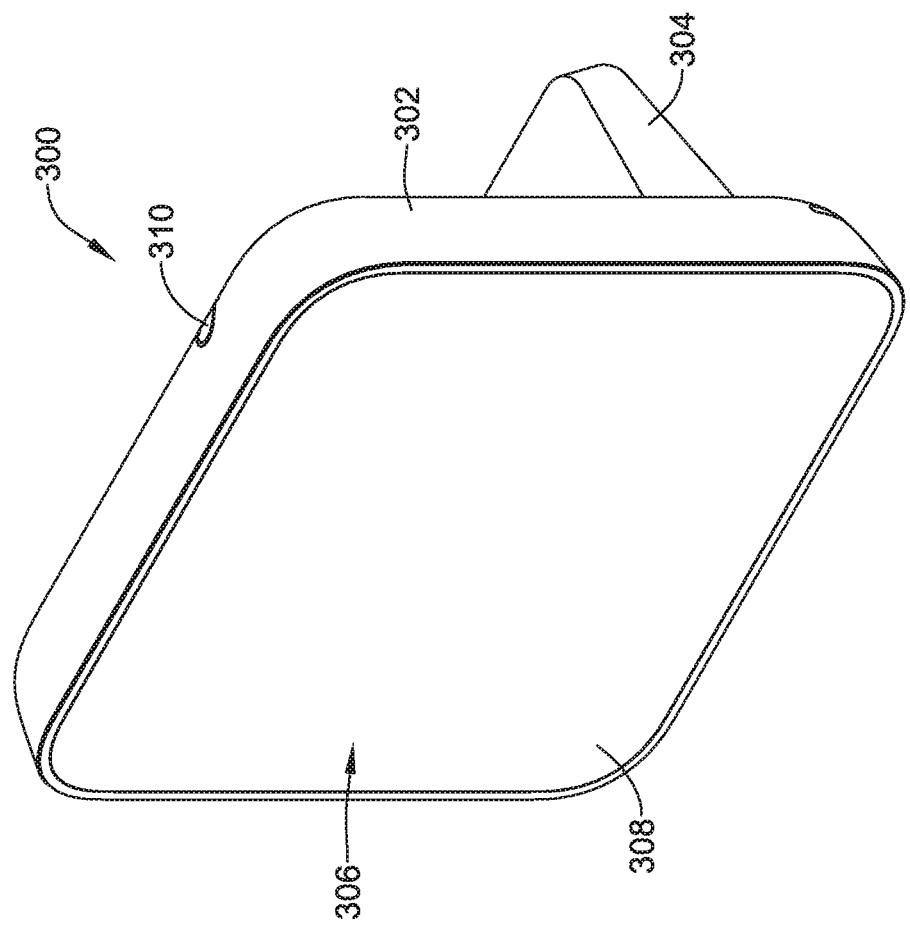
FIG. 3 is a perspective view of an illustrative wireless controller that may be an example of the wireless controller of FIG. 2.

FIG. 3 is a perspective view of an illustrative wireless controller 300 that may be an example of the wireless controller 200 of FIG. 2. The wireless controller 300 may send commands (e.g. IR codes) to set, for example, programmable setpoints, operating mode changes and/or other parameters to an HVAC unit. In the example shown, the wireless controller 300 may include a housing 302 and an optional stand 304 or other standing feature to aid in placing the wireless controller 300 on a surface, such as on the surface of a table, desk, counter, etc. Additionally and/or alternatively, in some cases, the wireless controller 300 may have a mounting feature to aid in mounting the wireless controller 300 to a wall or ceiling of a room in a building, house, or structure. If battery powered, the housing 302 may include a battery compartment for holding a battery or battery pack (not explicitly shown). The housing 302 may have any shape or size suitable for housing the internal electronics of the wireless controller 300.

The wireless controller 300 may include a user interface 306. In some cases, the user interface 306 may include a display 308. In some cases, the display 308 may include or may be an LCD, an OLED, etc., and in some cases a fixed segment display, a dot matrix LCD display, a 7-segment type display, and/or may include one or more LEDs. In the example shown, the display 308 is a touch screen LCD panel that functions as both the display 308 and a keypad. In other cases, the user interface may have a physically distinct keypad. In addition, the housing 302 may include an opening or window 310 to aid in communicating with an HVAC unit. The opening or window 310 may extend at least partially around an outer perimeter of the housing 302. In some cases, the window or opening 310 may be located along the top of the wireless controller 300. In some cases, the window 310 may be transparent or semi-transparent to the Infrared (IR), and an IR transmitter and/or receiver may be positioned just behind the window 310. The housing 302 may include a larger opening or window 310 than shown, or multiple windows 310, if desired.

Figure 4:
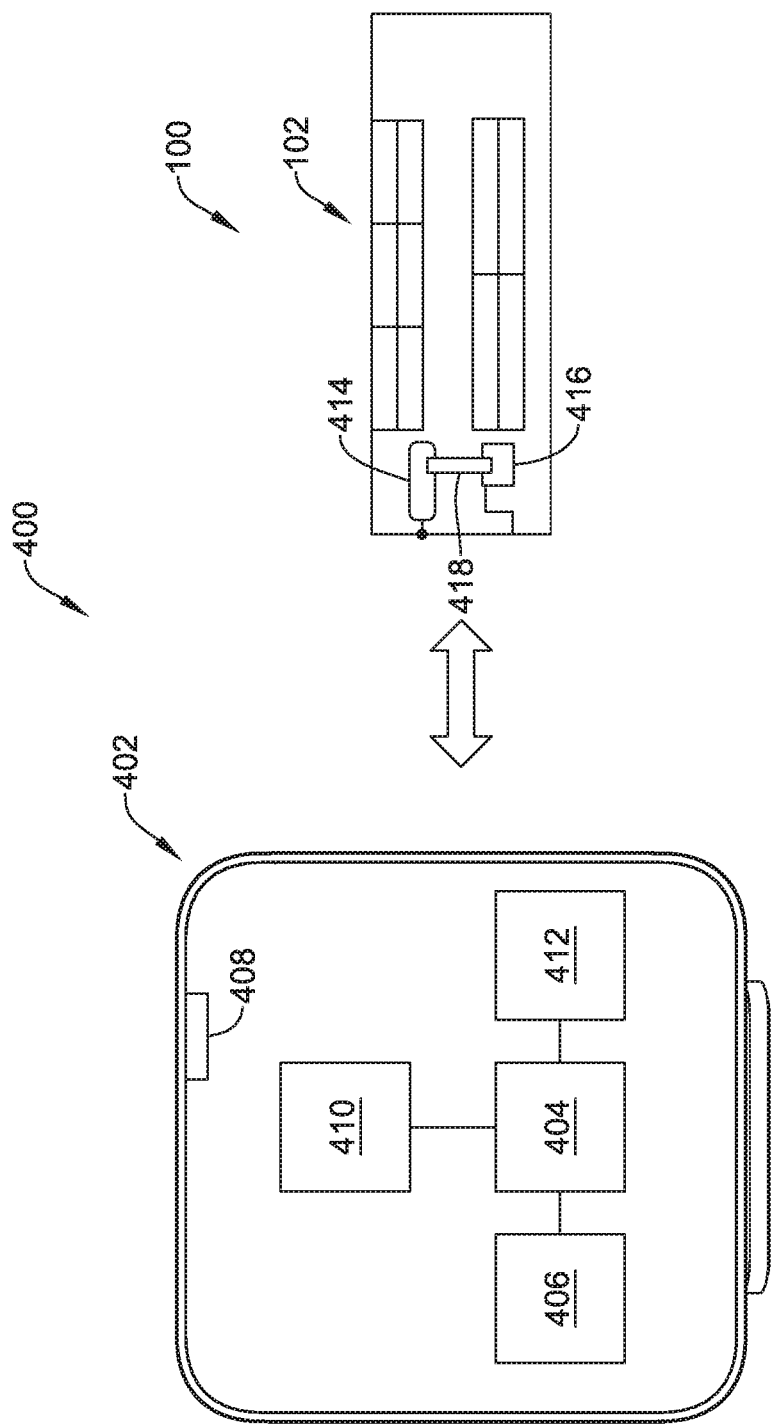
FIG. 4 is a schematic view of a building automation system.

FIG. 4 is a schematic view of an exemplary building automation system 400 that may facilitate remote access and/or control using a wireless controller 402, and that may be used to coordinate and control the HVAC unit 100 from FIG. 1. While an HVAC unit 100 is used as an example, it is contemplated that the wireless controller 402 may be used to facilitate remote access and/or control over other building automation systems, such as a security system or a lighting system.

As stated herein, the HVAC unit 100 may be a mini-split HVAC unit, however, this is not necessary. A front-view of the wireless controller 402 is shown in FIG. 4. As can be seen, the wireless controller 402 looks similar to the wireless controller 300 of FIG. 3. The configuration of the components and the operation of the wireless controller 402 may be similar to the wireless controller 200 of FIG. 2. As such, in the example of FIG. 4, the wireless controller 402 may include a controller 404 (e.g., microprocessor, microcontroller, etc.), a memory 406 (e.g., a non-volatile memory, a flash memory, a NAND flash memory, etc.), a transmitter 408 (e.g., an IR transmitter, RF transmitter, Bluetooth transmitter, etc.) a user interface 410 (e.g., a display and in some cases a keypad), and a temperature sensor 412.

According to various embodiments, the wireless controller 402 may be configured to set a programmable setpoint of the HVAC unit 100. The HVAC unit 100 may then thermostatically control the temperature in a space based at least in part on: (1) the temperature sensed by the temperature sensor 416 of the HVAC unit 100; and (2) the programmable setpoint received from the wireless controller 402.

Figure 5B:
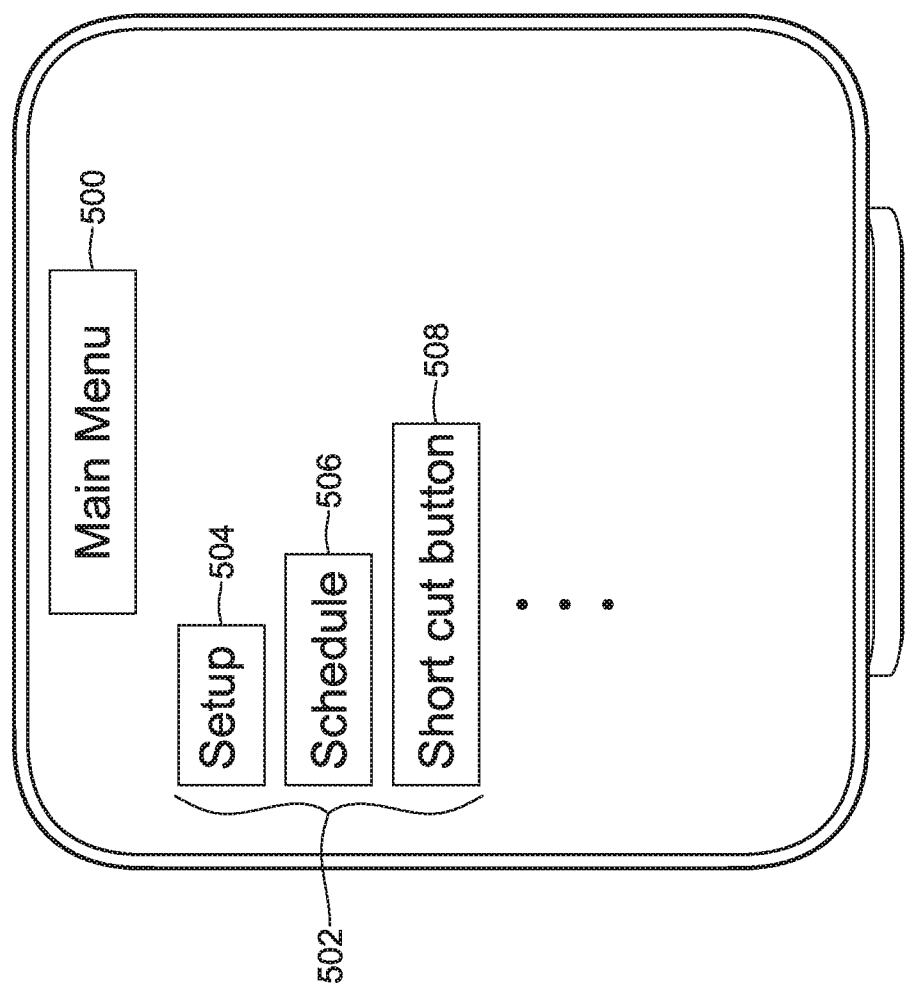

To configure communication between the wireless controller 402 and the HVAC unit 100, the wireless controller 402 may allow a user to set an appropriate IR protocol to use during the communication. For instances, as shown in FIG. 5A, the wireless controller 402 may include a user interface 410 with a display 420, and may display a main menu button 422 on the display 420 or may include a mechanical main menu button 422 adjacent to the display. As shown in FIG. 5B, after a user selects the main menu button 422, the controller 404 of the wireless controller 402 may use the display 420 to present a main menu screen 500 to the user, including a set of options 502. As can be seen, the set of options 502 may include a setup option 504, a schedule option 506, a shortcut button setup option 508, etc. This is just one example of a suitable main menu screen 500.

Figure 5C:
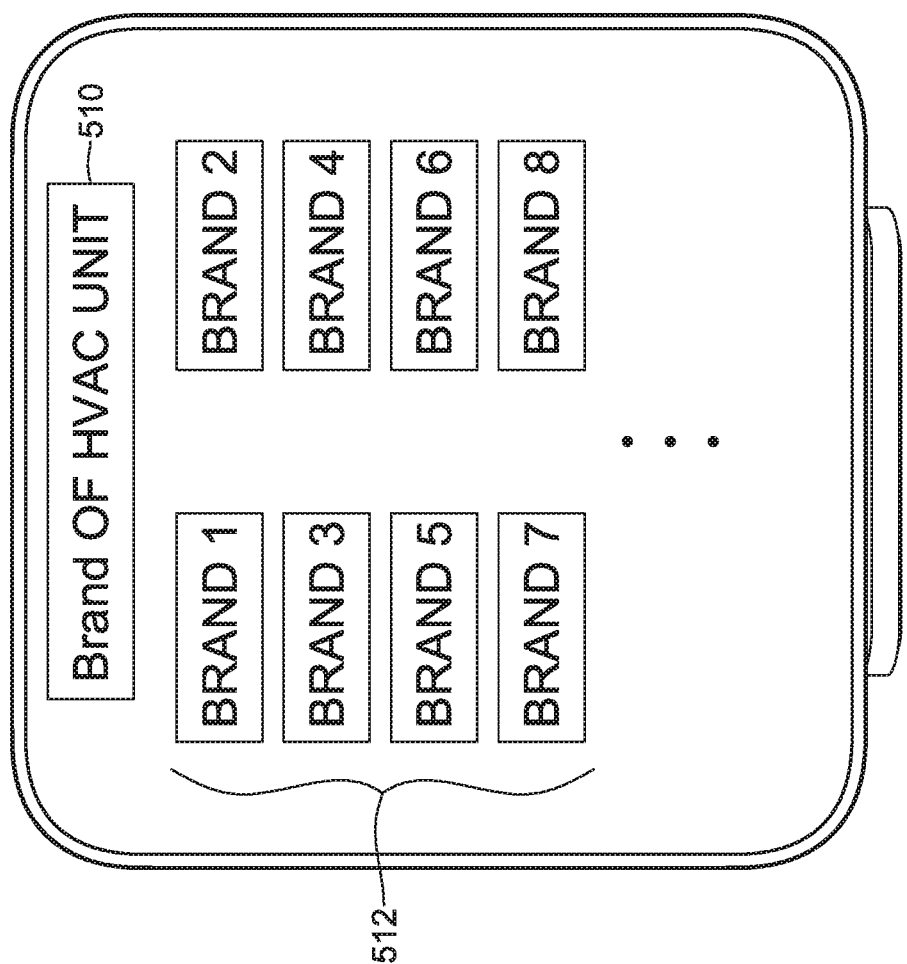
Figure 5D:
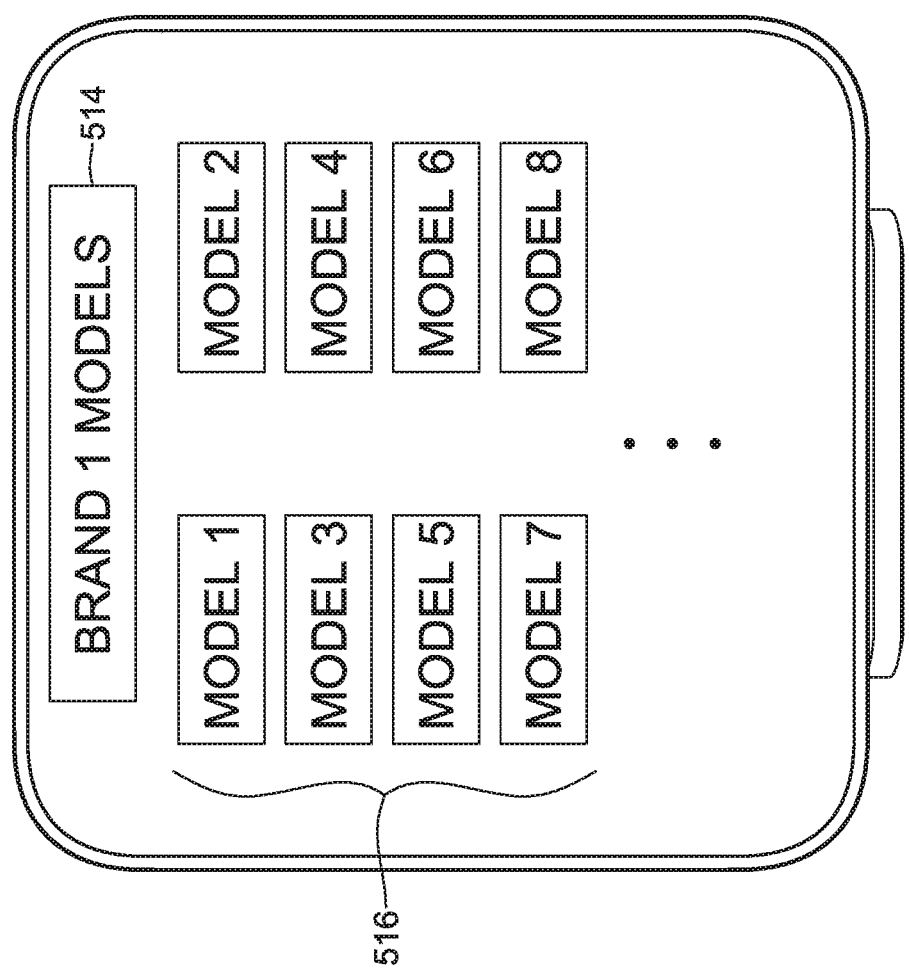

In some examples, to establish communication between the wireless controller 402 and HVAC unit 100, the user may select the setup option 504. After the setup option 504 is selected, and turning to FIG. 5C, the controller 404 may present a brand screen 510 to the user, including a set of HVAC brands 512. As can be seen, the set of HVAC brands 512 may include Brand 1, Brand 2, Brand 3, Brand 4, Brand 5, Brand 6, Brand 7, Brand 8, etc. In this case, the HVAC unit 100 that is in the user's space may be of Brand 1. As such, the user may select Brand 1 from the set of HVAC brands 512. Turning to FIG. 5D, the controller 404 may then use the display 420 to present a set of models 516 of HVAC units made by Brand 1 on a models screen 514. As can be seen, the set of Brand 1 models 516 may include Model 1, Model 2, Model 3, Model 4, Model 5, Model 6, Model 7, Model 8, etc. This is just one example.

Figure 5E:
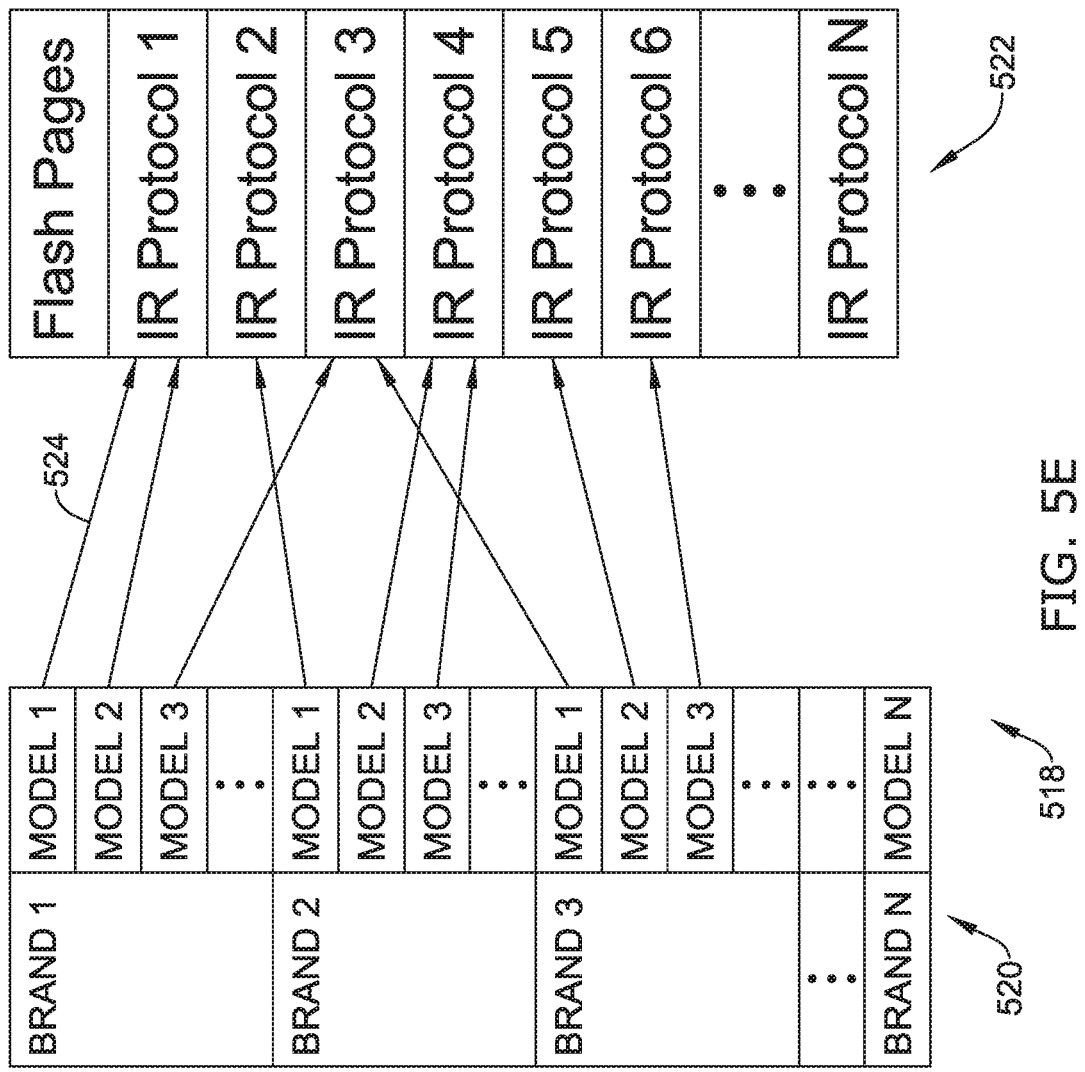
FIG. 5E is an exemplary diagram of an illustrative IR database.

Continuing with the example, the HVAC unit 100 that is in the user's space may be of Model 1. As such, the user may select Model 1 from the set of Brand 1 models 516. According to certain embodiments, once the user selects the appropriate model from the set of Brand 1 models 516, the controller 404 may access the memory 406 (see FIG. 4). As stated above, in some cases, the memory 406 may include a non-volatile memory, such as a NAND flash memory. Turning to FIG. 5E, in this example, the memory 406 may store an IR database 518. As shown, the IR database 518 may include a two-level table structure, which may help improve query performance into the IR database 518. In some cases, the IR database 518 may include a lookup table header 520 and flash pages 522. In some cases, the lookup table header may include or contain a plurality of building automation systems, such as HVAC units, security systems, lighting systems, etc. In some cases, the building automation systems may be categorize according to a brand (e.g., a brand name) and a model (e.g., model number). In some cases, the flash pages 522 may include or contain a plurality of IR protocols that correspond to (i.e., are used to communicate with) the plurality of building automation systems included in the lookup table. In some cases, each flash page from the flash pages 522 may contain one IR protocol and the corresponding IR codes, however, this is not necessary. In some cases, the lookup table header 520 may contain an index or address for the flash page(s) that corresponds to each brand/model combination.

During use, the controller 404 may match the selected Brand from the set of HVAC brands 512 and the selected Model from the set of models 516 with the corresponding Brand/Model entry in the lookup table header 520. The pointer or address 524 stored at that Brand/Model entry in the lookup table header 520 may point to the flash page 522 that contains the IR protocol and IR codes for that Brand/Model entry.

In some cases, the controller 404 may store the indication of correspondence between the HVAC unit 100 and the corresponding IR protocol in the memory 406. In some cases, this correspondence may be stored in a different part of the memory 406 than the non-volatile portion (i.e. the NAND flash memory) that stores the IR protocols, such as in a separate non-volatile portion or a cache memory portion, but this is not required. In certain embodiments, for the wireless controller 402 to send IR command signals to the HVAC unit 100, the controller 404 may access the memory 406, identify the indication of correspondence, use the indication of correspondence to identify the IR protocol and IR codes to use, and instruct the transmitter 408 to send IR command signals to the IR receiver 418 of the HVAC unit 100 in accordance with the identified IR protocol and IR codes.

Figure 6:
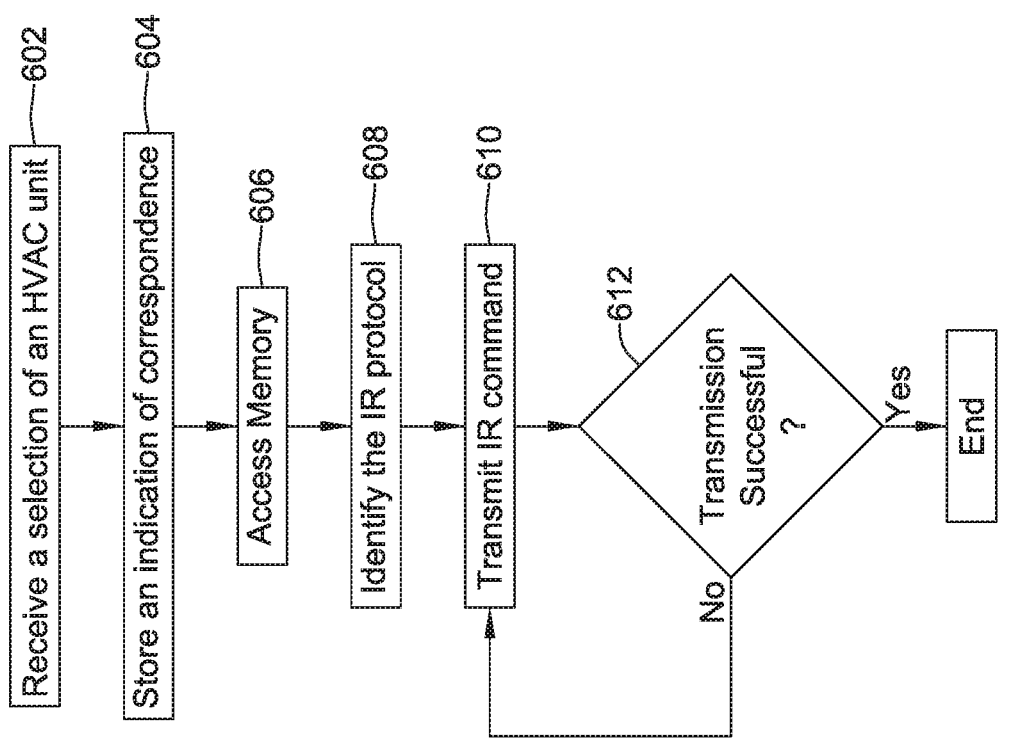
FIG. 6 is a flow diagram of an illustrative method for programming a wireless controller to communicate with a selected HVAC unit.

FIG. 6 is a flow diagram of an illustrative method 600 for programming a wireless controller to communicate with a selected HVAC unit. In some cases, the HVAC unit may be a mini-split HVAC unit. While an HVAC unit is used as an example, it is contemplated that the method may be used to communicate with a security system, lighting system, and/or any other suitable building automation system.

The method 600 may begin at step 602 where the wireless controller may receive a selection of a particular mini-split HVAC unit. The wireless controller may store the selection of the particular mini-split HVAC unit in memory. In some examples, the selection of the particular mini-split HVAC unit may be made by receiving a selection of a brand of the mini-split HVAC unit and receiving a selection of a model of the mini-split HVAC unit.

In some examples, a non-volatile memory may store an IR database. In some examples, the IR database may include a two-level table structure that includes a lookup table header and flash pages. In some examples, the lookup table header may include or contain a plurality of mini-split HVAC units categorized according to a brand and/or a model. In some examples, the flash pages may include or contain a plurality of IR protocols that correspond to the plurality of mini-split HVAC units in the lookup table header. In some cases, each flash page may contain one IR protocol and the corresponding IR codes, however, this is not necessary. In some cases, the lookup table header may contain an index or address for the flash page(s) that corresponds to each brand/model combination of the plurality of mini-split HVAC units. At step 604, the wireless controller may store an indication of the correspondence between the selected mini-split HVAC unit and the corresponding IR protocol in the non-volatile memory or a separate volatile or non-volatile memory.

At step 606, the wireless controller may access the non-volatile memory, and as step 608, the wireless controller may identify the IR protocol for use in communicating with the particular mini-split HVAC unit selected by the user. At step 610, the wireless controller may transmit IR commands (e.g. IR codes) to the particular mini-split HVAC unit in accordance with the identified IR protocol. In some examples, the wireless controller may transmit IR commands to set a programmable setpoint of the mini-split HVAC unit to a commanded setpoint temperature. In some examples, the commanded setpoint temperature may be based on a desired setpoint temperature set by a user and the temperature sensed by a temperature sensor of the wireless controller. At step 612, the wireless controller may determine if the transmission was successful. If the transmission was not successful, the wireless controller may return to step 610 and retry the transmission. If the transmission was successful, the method 600 may end.

Figure 7A:
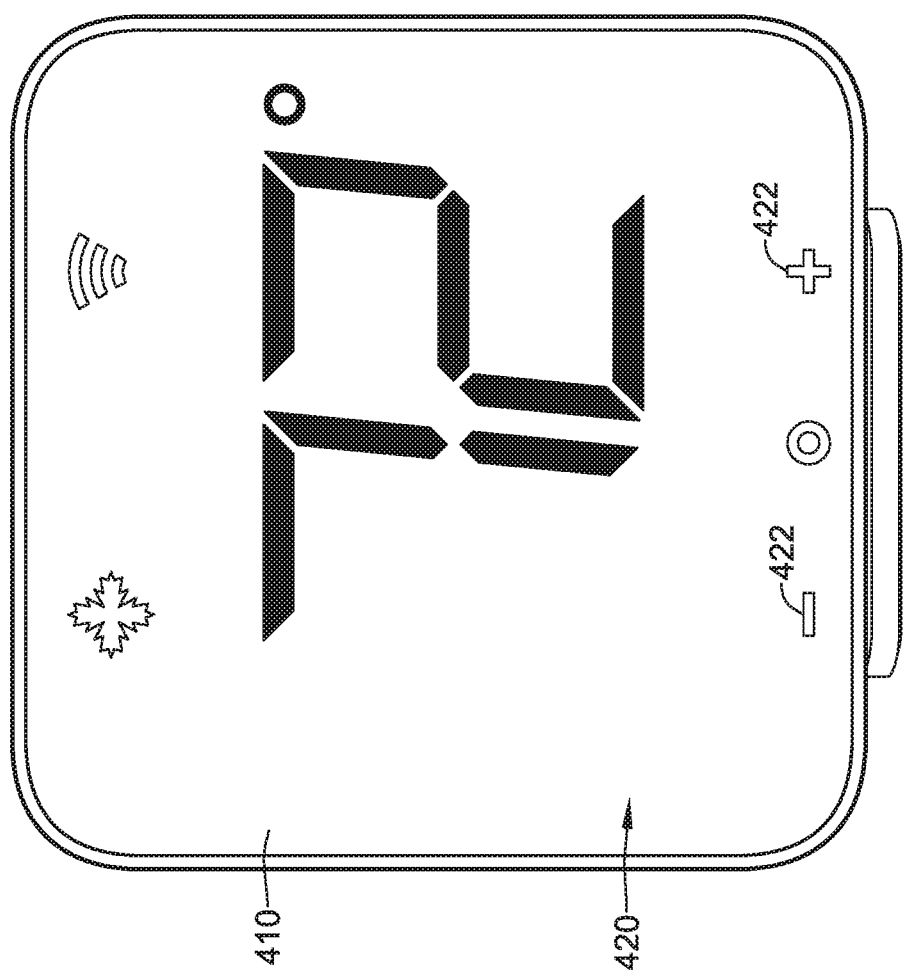
FIG. 7A is a schematic view of illustrative screen displayed on the wireless controller of FIG. 3.

Referring back to FIG. 4, once communication is established between the wireless controller 402 and the HVAC unit 100, the wireless controller 402 may send commands to set a programmable setpoint of the HVAC unit 100, and the HVAC unit 100 may then thermostatically control the temperature in the space based at least in part on: (1) the temperature sensed by a temperature sensor 416 of the HVAC unit 100; and (2) the set programmable setpoint. According to various embodiments, the wireless controller 402 may be programmed with a control algorithm that uses programmable setpoints, such as setpoint temperatures, to control and/or influence the operation of the HVAC unit 100. In some cases, the wireless controller 402 may receive a desired setpoint temperature from a user via the user interface 410 of the wireless controller 402. In the example shown in FIG. 7A, the user may use increment/decrement buttons 422 of the user interface 410 to enter and/or change the desired setpoint temperature. As can be seen, the setpoint temperature is set to 72° F. in FIG. 7A. Referring back to FIG. 4, the controller 404 may then instruct the transmitter 408 to send appropriate IR command signals to the IR receiver 418 of the HVAC unit 100 to set the programmable setpoint of the HVAC unit 100 to the desired temperature setpoint. In this example, the IR command signals may instruct the HVAC unit 100 to set the temperature in the space at 72° F.

Figure 7B:
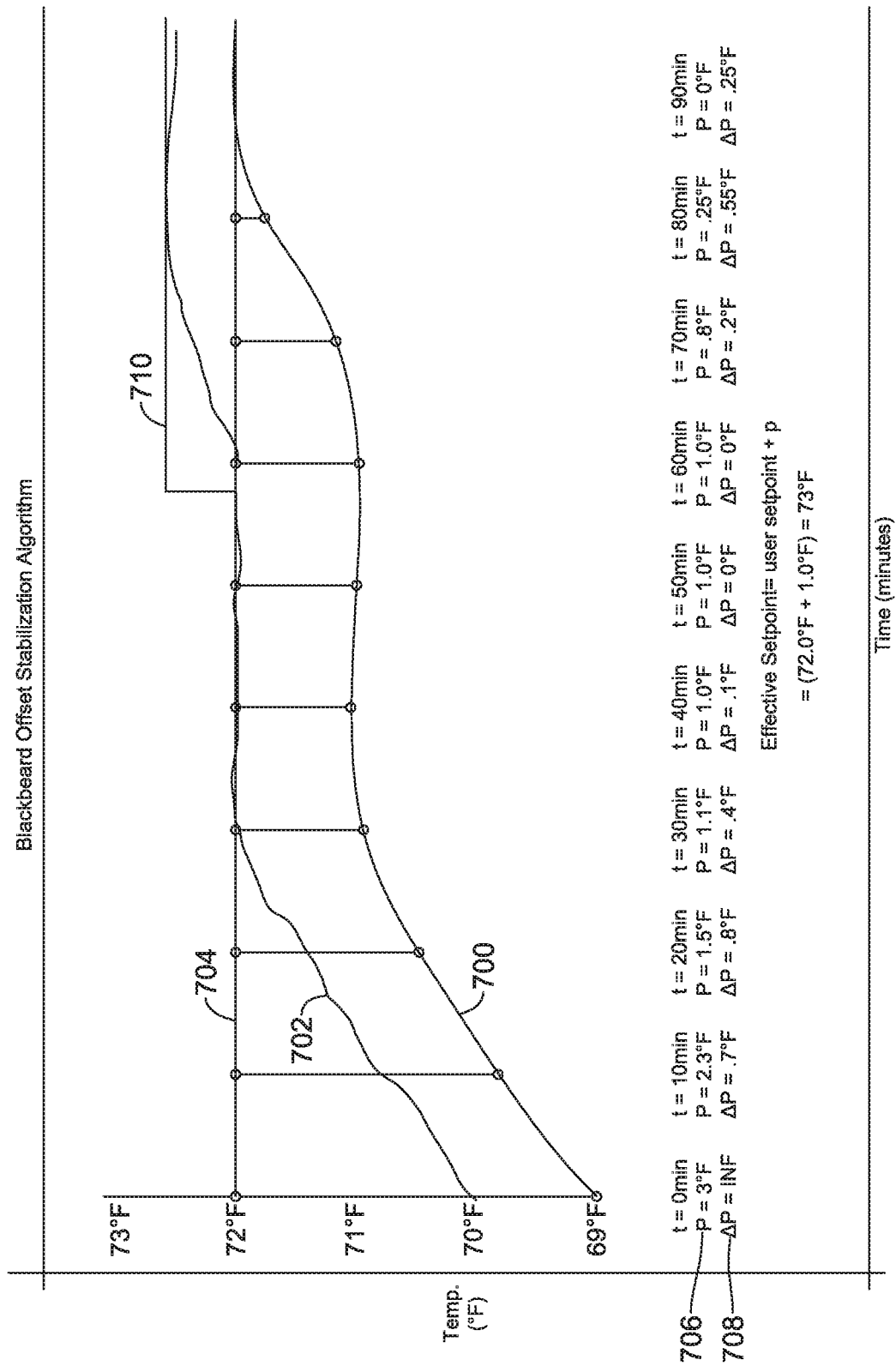
FIGS. 7B-7C show temperature versus time graphs that illustrates examples of the method of FIG. 6.

FIG. 7B depicts an exemplary graph of the operation of the building automation system 400 in a heating mode after receiving the 72° F. setpoint temperature from the wireless controller 402. FIG. 7B shows a Wireless Controller Sensed (WCS) temperature 700 sensed by the temperature sensor 412 of the wireless controller 402, an HVAC Unit Sensed (HUS) temperature 702 sensed by the temperature sensor 416 of the HVAC unit 100, and a desired setpoint temperature 704. In the example shown, the control algorithm of the controller 404 of the wireless controller 402 may sample the WCS temperature 700 every 10 minutes. In other cases, this sampling period may be every 2 minutes, 5 minutes, 10, minutes, 20 minutes, 30 minutes, hour, 2 hours, 5 hours, 2 days, or any other suitable sample period. In some cases, this sample period may be dynamic, and may be based on, for example, the rate of change of the Wireless Controller Sensed. In any event, an offset temperature 706 may be calculated at each sampling period by finding a difference between the desired setpoint temperature 704 and the WCS temperature 700. A change in the offset temperature may also be calculated at each sampling period by finding a difference in the offset temperature 706 of the current sampling period from the offset temperature 706 of the previous sampling period.

In the example shown in FIG. 7B, the WCS temperature 700 is initially at 69° F., the HUS temperature 702 is initially at 70° F. (e.g. because the HVAC Unit 100 is mounted near the ceiling), and the offset temperature is 3° F. In some cases, the HVAC Unit 100 may communicate the HUS temperature 702 to the wireless controller 402. However, in other cases, the wireless controller 402 may not know the HUS temperature 702, and as will be discussed below, the wireless controller 402 may determine a measure of the HUS temperature 702 using the WCS temperature 700, the desired setpoint temperature 704, and the offset temperature 706.

Continuing with the example of FIG. 7B, after 10 minutes with the HVAC unit 100 in the heating mode, the WCS temperature 700 has increased to 69.7° F., making the offset temperature 706 2.3° F., and the change in the offset temperature 708 0.7° F. After another ten minutes with the HVAC unit 100 in the heating mode, the WCS temperature 700 sensed by the wireless controller 402 has increased to 70.5° F., making the offset temperature 706 1.5° F., and the change in the offset temperature 708 0.8° F. After another ten minutes with the HVAC unit 100 in the heating mode, the WCS temperature 700 has increased to 70.9° F., making the offset temperature 706 1.1° F., and the change in the offset temperature 708 0.4° F. After yet another ten minutes with the HVAC unit 100 in the heating mode, the WCS temperature 700 has increased to 71° F., making the offset temperature 706 1.0° F., and the change in the offset temperature 708 0.1° F. After another ten minutes with the HVAC unit 100 in the heating mode, the WCS temperature is still at 71° F., making the offset temperature 706 1.0° F., and the change in the offset temperature 708 0.0° F. As can be seen, the WCS temperature 700 has stabilized at 71° F.

In various embodiments, the control algorithm may provide instructions for the controller 404 of the wireless controller 402 to wait until the WCS temperature 700 has stabilized to determine whether additional commands need to be sent to adjust the temperature setpoint of the HVAC Unit 100. In some cases, stabilization may be determined based on the change in the offset temperature 708. For example, if the offset temperature 706 has not changed or has changed very little over a given time interval, it may be understood that the thermostatic control of the HVAC unit 100 is now cycling on and off to maintain the space temperature as measured by the HVAC unit 100 (e.g. the HUS temperature 702), which in this example shown is different from the WCS temperature 700. As such, the WCS temperature 700 (the temperature at the wireless controller) is not likely to change much further in response to the 72° F. setpoint temperature command that was sent to the HVAC unit 100.

As noted above, stabilization may be determined based on the change in the offset temperature 708. For instance, in the present case, the controller 404 may wait to receive two consecutive sample periods where the change in offset temperature 708 has a value that is less than or equal to a 0.05° F. threshold to determine that the WCS temperature 700 has stabilized. In other cases, the controller 404 may use a longer time interval (e.g., three, four, five, etc. consecutive sample periods) or a shorter interval (e.g., one sampling period of the change in offset temperature 708 having a 0.0° F. of less value) to determine whether the WCS temperature 700 has stabilized. In some cases, the controller 404 may use a larger change of rate threshold (e.g., 0.1° F., 0.15° F., 0.2° F., 0.3° F., etc.) or a smaller change of rate threshold (e.g., 0.04° F., 0.03° F., 0.02° F., 0.01° F., etc.), as desired. In some cases, the change of rate threshold may be dynamic, and may be dependent on, for example, the season, heating or cooling mode of the HVAC unit 100, and/or any other suitable parameter.

Once the controller 404 determines that the WCS temperature 700 has stabilized, the controller 404 may use the offset temperature 706 between the desired temperature setpoint 704 and the WCS temperature 700 to determine whether additional commands need to be sent to the HVAC unit 100. For example, in some cases, the control algorithm of the wireless controller 402 may use a threshold comfort offset to the controller 404. In some cases, if the offset temperature 706 is greater than or equal to the threshold comfort offset, then the controller 404 may determine an updated control setpoint temperature 710. The updated control setpoint temperature may be based on the offset temperature 706 and the previous setpoint temperature 704 (i.e., 72° F.). For instance, in the current example, the threshold comfort offset may be ±0.5° F. Accordingly, if the offset temperature 706 is within ±0.5° F. of 72° F., then the wireless controller 402 may allow the HVAC unit 100 to continue its operation of maintaining the current temperature in the space. However, as in the example shown, the offset temperature is 1.0° F., which is greater than the threshold comfort offset of ±0.5° F. As such, the wireless controller 402 may determine that the HUS temperature 702 is currently at 72° F. (i.e., the temperature sensor 416 of the HVAC unit 100 is sensing a temperature of 72° F. in the space, and the temperature sensor 412 of the wireless controller 402 is sensing a temperature of 71° F. in the space). The controller 404 may determine an updated control setpoint temperature 710 by adding the stabilized offset temperature 706 (i.e., 1.0° F.) to the current setpoint temperature 704 (i.e., 72° F.). The controller 404 may then instruct the transmitter 408 of the wireless controller 402 to send IR command signals to the IR receiver 418 of the HVAC unit 100 (in accordance with the appropriate IR protocol) to change the setpoint temperature 704 of the HVAC unit 100 to the updated control setpoint temperature 710 (i.e., 73° F.).

In some cases, even though the wireless controller 402 has sent IR command signals to the HVAC unit 100 to update the setpoint temperature, the controller 404 may not display the updated control setpoint temperature on the display 420 of the user interface 410 of the wireless controller 402. Rather, the controller 404 may continue to display the initial setpoint temperature or the desired setpoint temperature (i.e., 72° F.) on the display 420. However, in other embodiments, the controller 404 may use the display 420 to indicate that it has updated the setpoint temperature.

Continuing with the example of FIG. 7B, the IR command signals may force the HVAC unit 100 to adjust its operation from maintaining the current temperature in the space to increasing the temperature in the space to the new updated control setpoint temperature 710 (i.e., 73° F.). After ten minutes, the controller 404 may sample the WCS temperature 700 and find that the WCS temperature has increased to 71.2° F., making the offset temperature 706 0.8° F., and the change in the offset temperature 708 0.2° F. After another ten minutes, the WCS temperature 700 has increased to 71.75° F., making the offset temperature 706 0.25° F., and the change in the offset temperature 708 0.55° F. After another ten minutes, the WCS temperature 700 has increased to 72° F., making the offset temperature 706 0.0° F., and the change in the offset temperature 708 0.25° F. In some cases, once the HUS temperature reaches the setpoint temperature, whether it is the desired setpoint temperature or the updated control setpoint temperature, the HVAC unit 100 cycle on and off to maintain the HUS temperature at the updated control setpoint temperature 710 of 73° F.

Figure 7C:
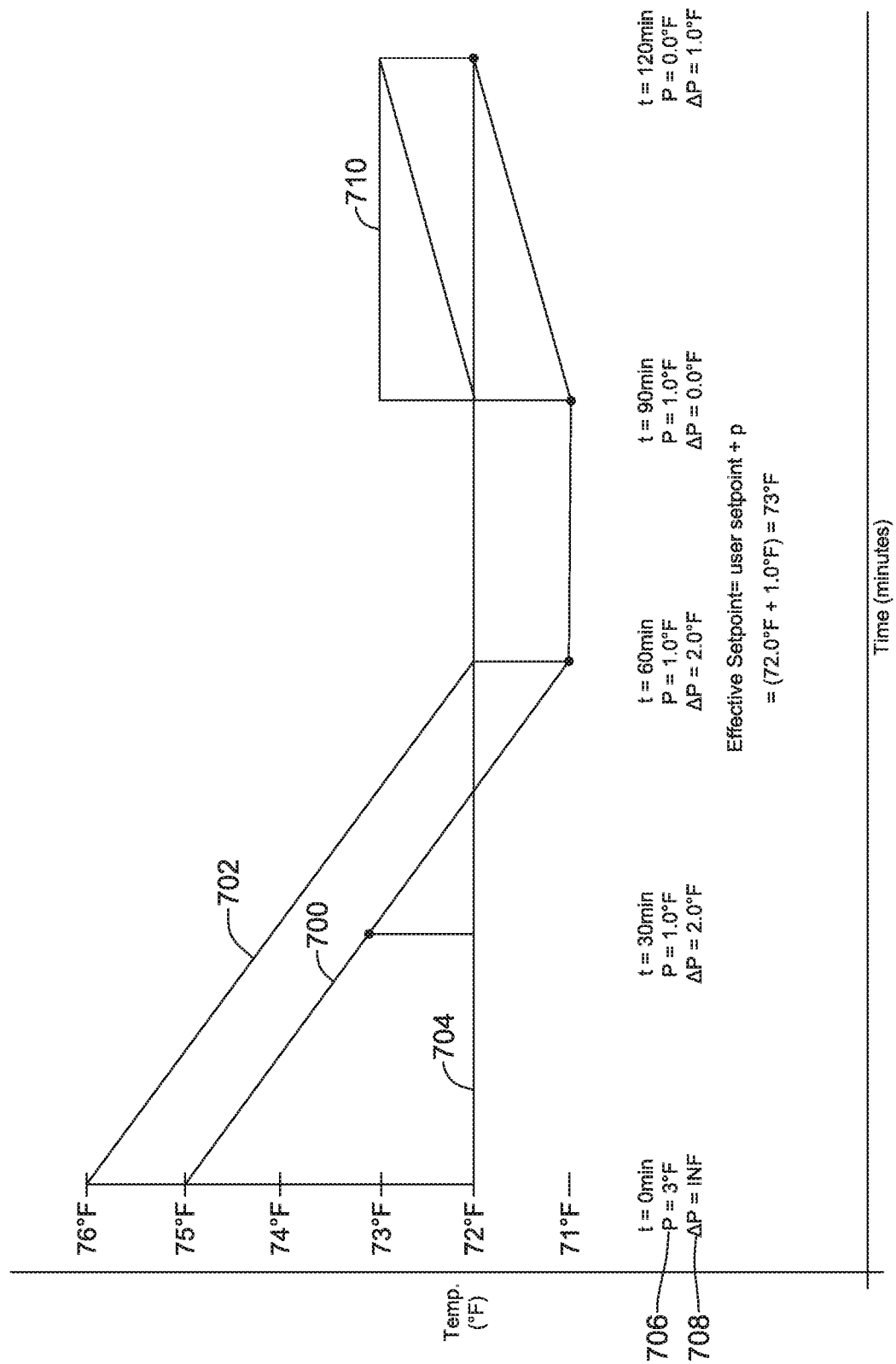

FIG. 7C depicts another exemplary graph of the operation of the building automation system 400 in a cooling mode after receiving a 72° F. setpoint temperature from the wireless controller 402. In this example, the control algorithm of the wireless controller 402 may provide instructions to sample the WCS temperature 700 every 30 minutes (or any other suitable sample period). As shown, the WCS temperature 700 is initially at 75° F., the HUS temperature 702 is initially at 76° F., and the offset temperature is –3.0° F. After 30 minutes, the WCS temperature 700 has decreased to 73° F., making the offset temperature 706 –1.0° F., and the change in the offset temperature 708 2.0° F. After another 30 minutes, the WCS temperature 700 has now decreased to 71° F., making the offset temperature 706 1.0° F., and the change in the offset temperature 708 2.0° F. After another 30 minutes, the WCS temperature 700 remains at 71° F., keeping the offset temperature 706 1.0° F., and the change in the offset temperature 708 0.0° F.

In this example, the controller 404 may wait one sample period to determine if the change in offset temperature 708 has a value that is either less than or equal to a 0.05° F. change rate threshold (or other change rate threshold) to determine that the WCS temperature 700 has stabilized. Accordingly, since the change in offset temperature 708 is less than the change rate threshold at the current sampling period, the controller 404 may determine that HVAC unit 100 is not cycling on and off to maintain the temperature in the space and therefore, the WCS temperature 700 is unlikely to change further in response to the transmitted 72° F. setpoint temperature. Once the controller 404 determines that the WCS temperature 700 has stabilized, the controller 404 may determine if the offset temperature is greater than or equal to a ±0.5° F. threshold offset (or any other suitable threshold offset). Since the offset temperature is 1.0° F., the wireless controller 402 may determine that the HUS temperature 702 is currently at 72° F. In response, the controller 404 may instruct the transmitter 408 to send IR command signals to the IR receiver 418 of the HVAC unit 100 in accordance with the appropriate IR protocol to change the setpoint temperature 704 of the HVAC unit 100 to an updated control setpoint temperature 710 (i.e., 73° F.). In some cases, the IR command signals may force the HVAC unit 100 to adjust its operation from maintaining the current temperature in the space to increasing the temperature in the space to the new updated control setpoint temperature 710 (i.e., 73° F.).

After 30 minutes, the controller 404 may sample the WCS temperature 700 once again and find that the WCS temperature has increased to 72° F., making the offset temperature 706 0.0° F., and the change in the offset temperature 708 1.0° F. Once the HUS temperature 702 reaches the current setpoint temperature of the HVAC unit 100, the HVAC unit 101 may cycle on and off to maintain that temperature. This will maintain the desired WCS temperature at the wireless controller 402.

According to certain embodiments, the control algorithm may be stored in the memory 406. In some cases, the control algorithm may reference a schedule, and the controller 404 may instruct the transmitter 408 to send IR command signals to the IR receiver 418 of the HVAC unit 100 to set desired setpoint temperatures at designated times. In various cases, when there is an initially determined offset temperature (e.g., the offset temperature 706) between the setpoint temperature 704 and the stabilized WCS temperature 700, the desired setpoint temperatures may be calculated by adding the offset temperature 706 to the desired setpoint temperatures from the schedule at each corresponding time. As such, the wireless controller 402 may automatically set a setpoint temperature (e.g., the setpoint temperature 704) to an appropriate updated control setpoint temperature (e.g., the updated control setpoint temperature 710) for a given space without having to reevaluate the offset temperature between the setpoint temperature and the stabilized controller temperature during each schedule time period. Instead, it is contemplated that once a stabilized offset temperature 706 is determined, that same stabilized offset temperature 706 may be used for a significant length of time. In some cases, the stabilized offset temperature 706 may only be updated every week, month, upon a change in season, or at any other interval or upon request by the user.

Figure 8:
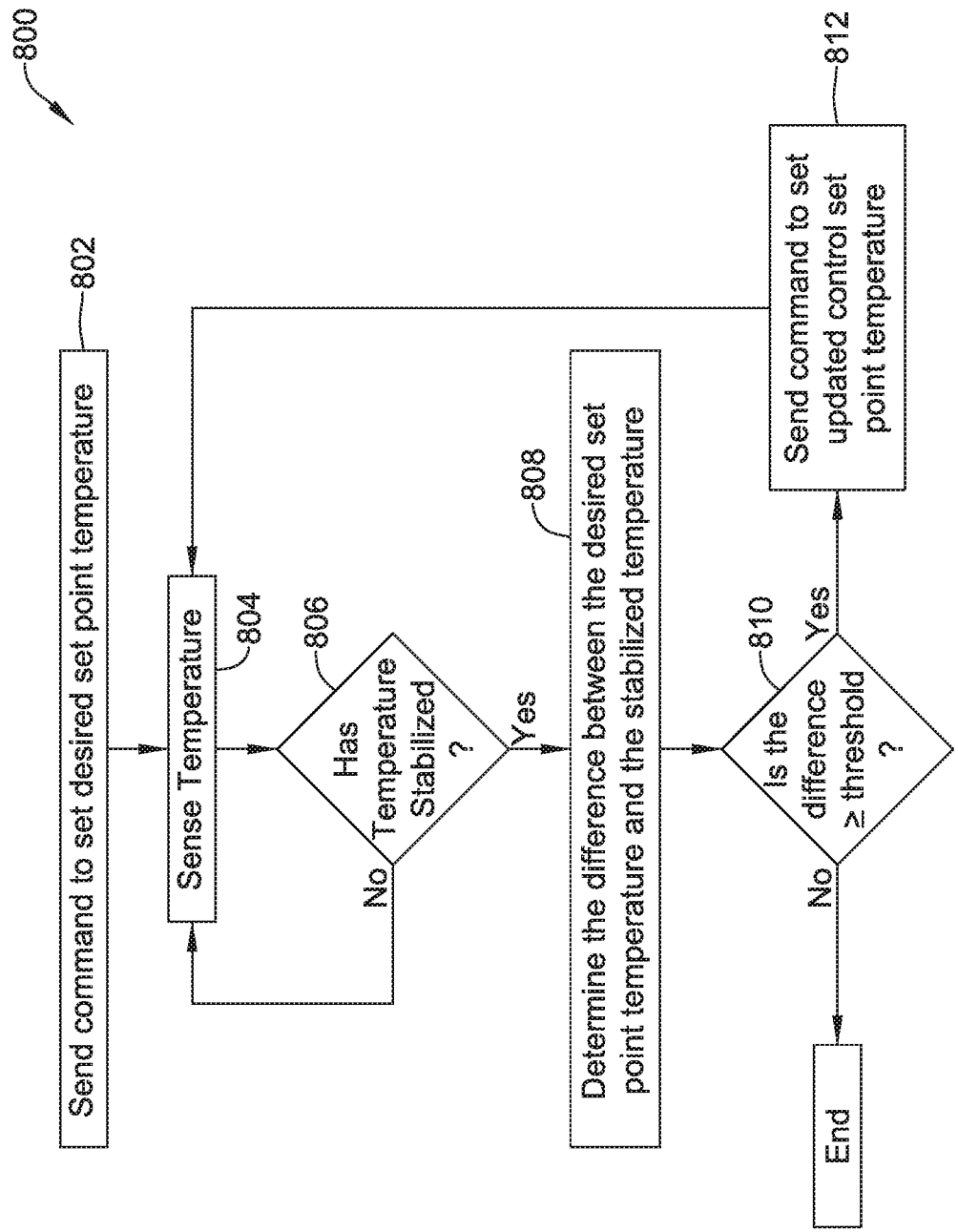
FIG. 8 is a flow diagram of another illustrative method of using a wireless controller to control a mini-split HVAC unit.

FIG. 8 shows an illustrative method 800 for a wireless controller 402 to remotely control a mini-split HVAC unit 100 configured to receive commands to set a programmable setpoint of the mini-split HVAC unit 100 such that the mini-split HVAC unit 100 may thermostatically control the temperature in a space based at least in part on the temperature sensed by a local temperature sensor 416 of the mini-split HVAC unit 100 and the programmable setpoint. The illustrative method 800 begins at step 802, where the wireless controller 402 may send a command from a remote location to set the programmable setpoint of the mini-split HVAC unit 100 to a desired setpoint temperature. In some examples, the wireless controller 402 may receive the desired setpoint temperature from a user via a user interface of the wireless controller 402. The wireless controller 402 may send a command to the mini-split HVAC unit 100 using IR signals, in accordance with an appropriate IR protocol, to set the temperature setpoint of the HVAC unit 100 to the desired setpoint temperature.

At step 804, the wireless controller 402 may sense the temperature from the remote location. In some examples, the wireless controller 402 may sense the temperature at specific time intervals (e.g., every 10 minutes, every 20 minutes, every 30 minutes, every hour, etc.). After waiting and sensing the temperature at a time interval, at step 806, the wireless controller 402 may determine whether the temperature sensed has stabilized. In some examples, stabilization may be determined based on the change in the sensed temperature over the specified time interval. For instance, if the sensed temperature has not changed or has changed very little over the specified time interval, it may be understood that the mini-split HVAC unit 100 is now cycling on and off to maintain the temperature in the space, and therefore the temperature sensed by the wireless controller 402 is unlikely to change significantly going forward. If the sensed temperature has not stabilized, the wireless controller 402 may wait till the next time interval and sense the temperature again at step 804. This may continue until the sensed temperature has stabilized.

Once the sensed temperature has stabilized, at step 808, the wireless controller 402 may determine a stabilized offset temperature by finding the difference between the desired setpoint temperature and the stabilized temperature. At step 810, the wireless controller 402 may determine whether the difference between the desired setpoint temperature and the stabilized temperature is greater than or equal to a specified threshold. If the difference is less than the specified threshold, the wireless controller may allow the mini-split HVAC unit 100 to continue its operation without adjusting its temperature setpoint, and method 800 may end. If the difference is greater than or equal to the specified threshold, at step 812, the wireless controller 402 may send a command to the mini-split HVAC unit 100 to set the programmable setpoint to an updated control setpoint temperature. In some examples, the wireless controller may determine the updated control setpoint temperature by adding the stabilized offset temperature to the desired setpoint temperature. In some examples, the wireless controller 402 may send a command to the mini-split HVAC unit 100 using IR signals, in accordance with an appropriate IR protocol, that changes the temperature setpoint of the HVAC unit 100 to the updated control setpoint temperature. Once the command has been sent, the wireless controller 402 may wait till the next time interval and sense the temperature again at step 804. The wireless controller 402 may then proceed with method 800 in a similar fashion until the sensed temperature is at the desired setpoint temperature or the difference between the desired set pint temperature and the stabilized temperature is within a specified threshold.

According to various embodiments, the user interface 410 of the wireless controller 402 may be configured with a shortcut button. In some cases, the shortcut button may be a physical button (e.g., an electromechanical button) spaced from the display and potentially grouped with other physical buttons, such as on a keypad, for example. In other cases, such as when the display 420 is a touchscreen, the shortcut button may be on the display. In some cases, the shortcut button may be created and/or updated by the controller 404 by assigning a function or a plurality of functions to the shortcut button. For example, and referring back to FIG. 5A, the user may select the main menu button 422. As shown in FIG. 5B, after the user selects the main menu button 422, the controller 404 may use the display 420 to present the main menu screen 500 to the user, including a set of options 502. As can be seen, the set of options 502 may include the setup option 504, the schedule option 506, the shortcut button setup option 508, etc. In some examples, to create and/or update the shortcut button, the user may select the shortcut button setup option 508.

Figure 9A:
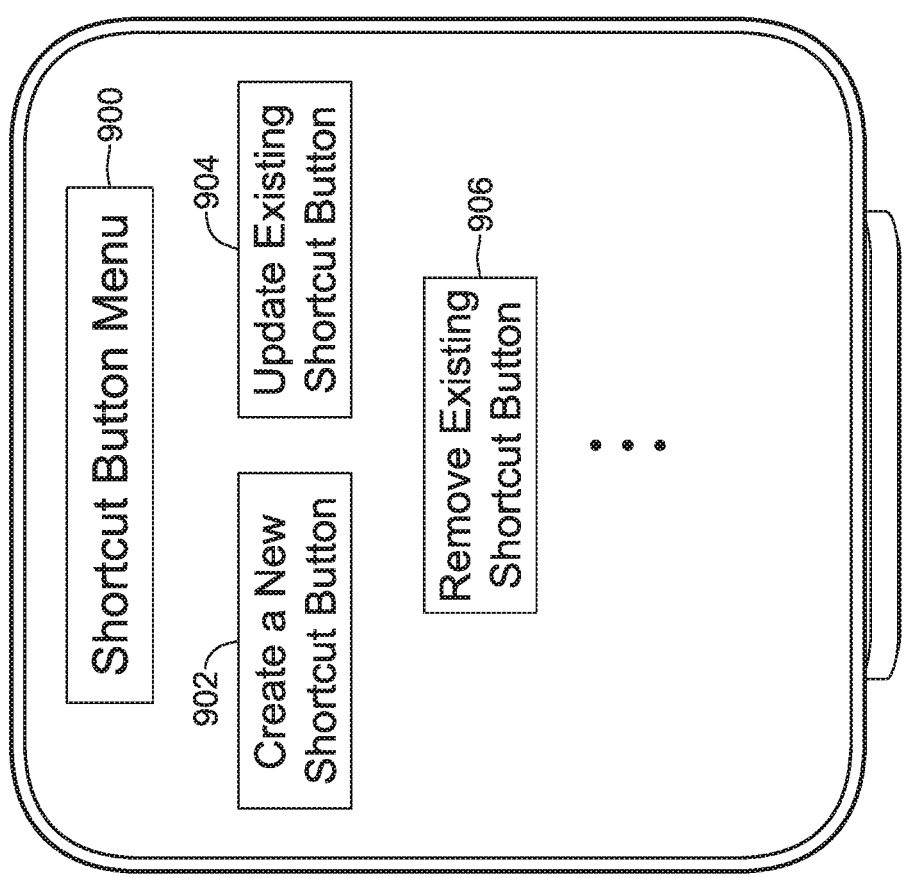
Figure 9B:
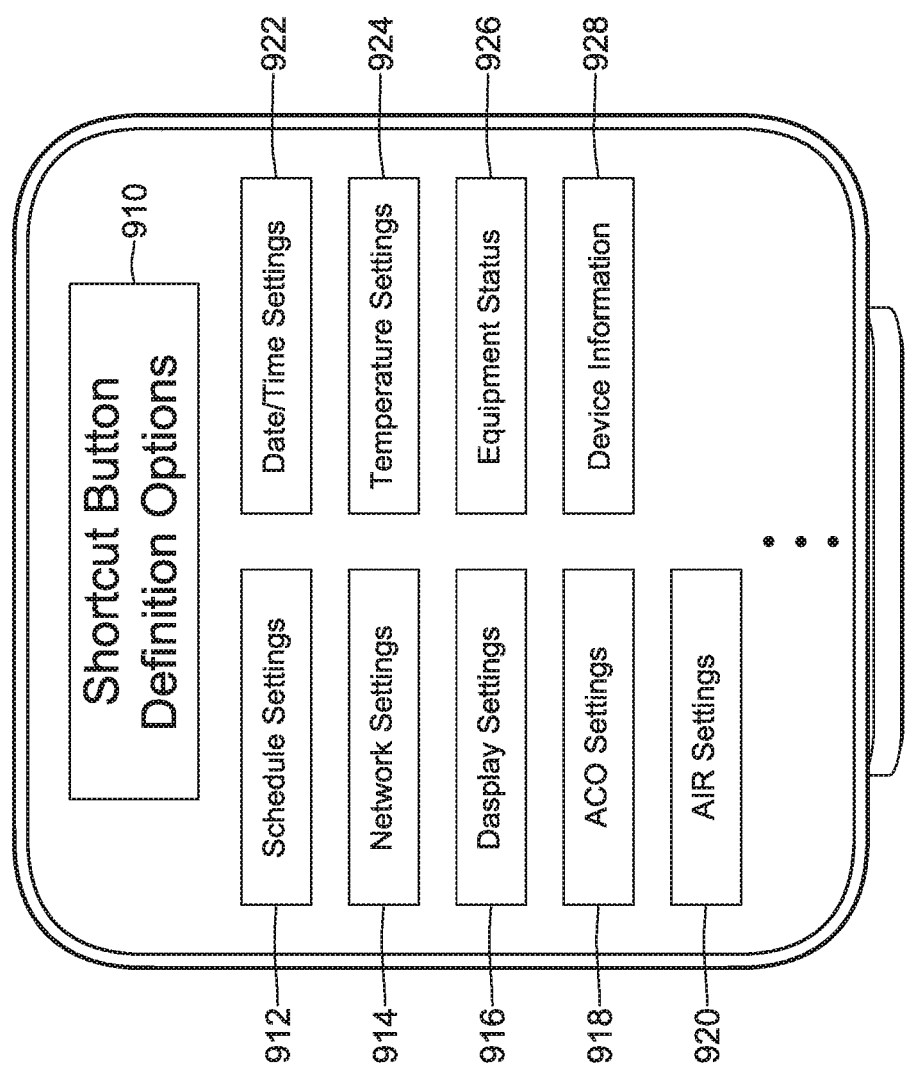

Turning to FIG. 9A, and in the example shown, after the shortcut button setup option 508 is selected, the controller 404 may use the display 420 to present a shortcut button menu screen 900 that includes a create a new shortcut button option 902, an update existing shortcut button option 904, and a remove existing shortcut button option 906. This is just one example of the shortcut button menu screen 900 and the various options that may be presented on the shortcut button menu screen 900. In this case, the user may select create a new shortcut button option 902. The controller 404 may then use the display 420 to present a shortcut button definition options screen 910, as shown in FIG. 9B. In some cases, the shortcut button definition option screens 910 may include a schedule settings option 912, a network settings option 914, a display settings option 916, an auto changeover (ACO) settings option 918, an adaptive intelligent recovery (AIR) settings option 920, a date/time settings option 922, a temperature settings option 924, an equipment status option 926, and a device information option 928. This is just one example of the shortcut button definition options screen 910 and the various options that may be presented on the shortcut button menu screen 900. In the example shown, the user selects the schedule settings option 912.

Figure 9C:
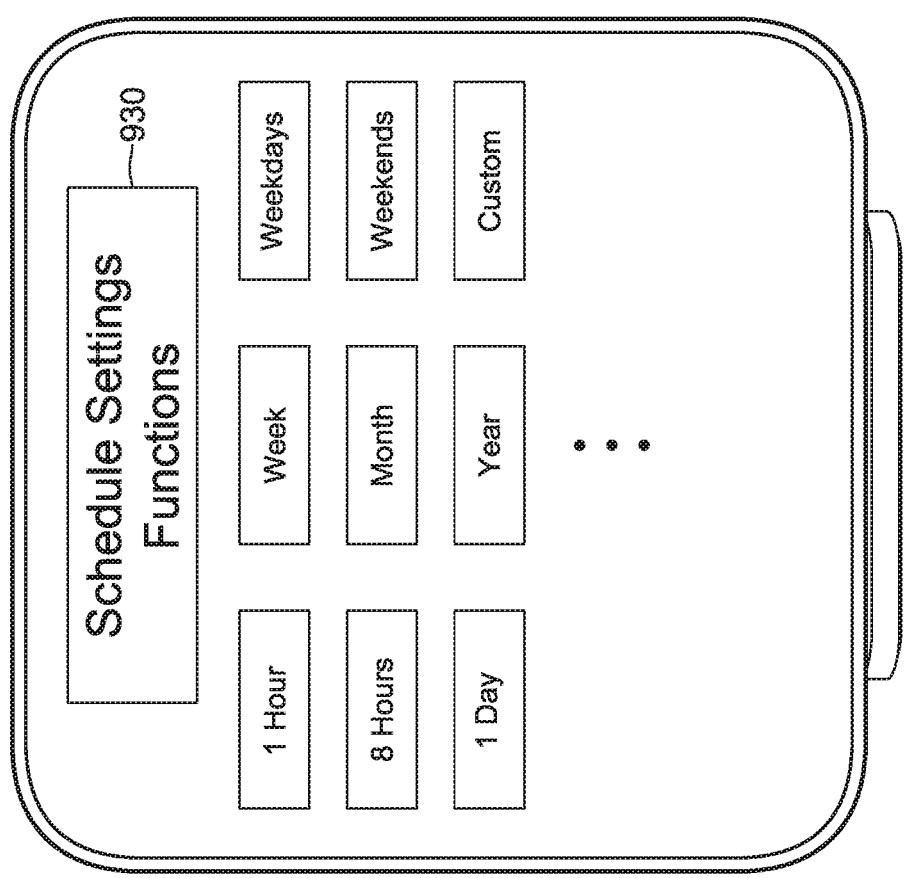

Turning to FIG. 9C, the controller 404 may then use the display 420 to present a schedule settings functions screen 930. In some cases, the schedule settings functions screen 930 may include an hour scheduling option, an eight hour scheduling option, a day scheduling option, a week scheduling option, a month scheduling option, a year scheduling option, a weekdays scheduling option, a weekends scheduling option, and a custom scheduling option. This is just one example of the schedule settings functions screen 930 and the various schedule functions that may be presented on the schedule settings functions screen 930. In this case, the user selects the weekdays scheduling option.

Figure 9D:
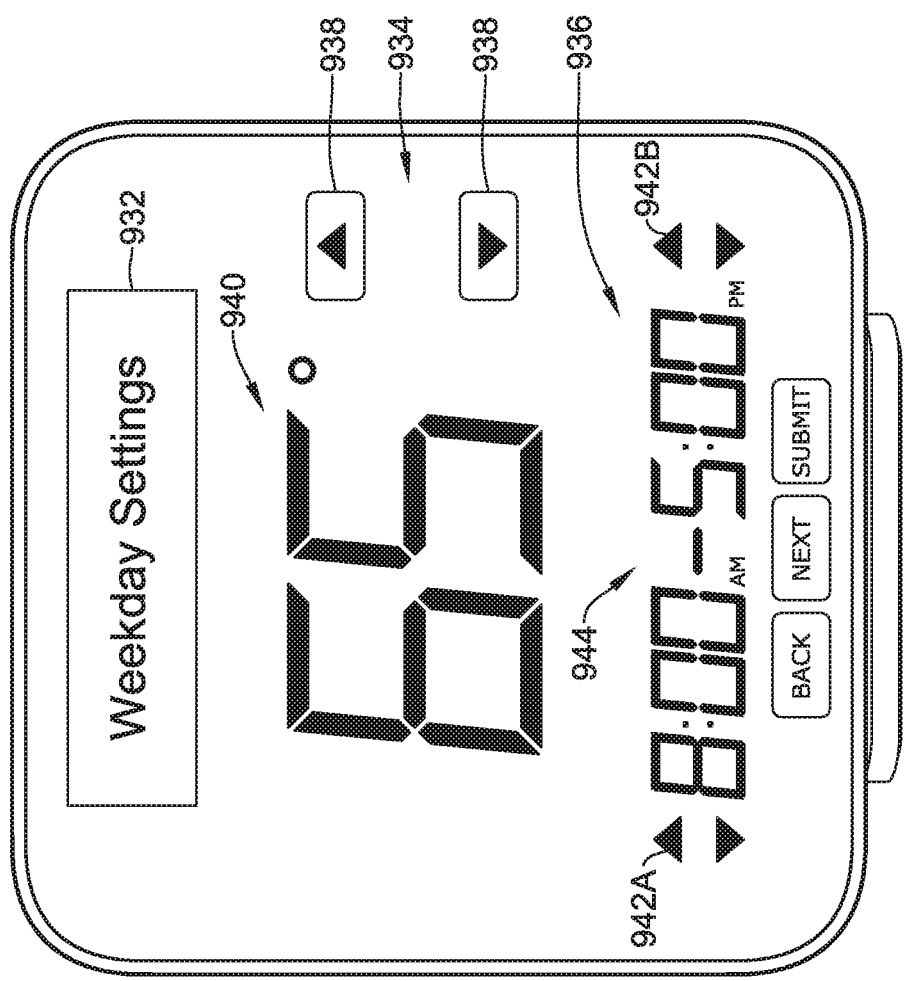

Turning to FIG. 9D, the controller 404 may then use the display 420 to present a weekday settings screen 932. In some cases, the weekday settings screen 932 may include a temperature settings portion 934 and a time settings portion 936. In some cases, the user may use increment/decrement temperature arrows 938 to increase or decrease a setpoint temperature 940. In some cases, the user may also use increment/decrement time arrows 942A and 942B to change a time interval 944 for which the setpoint temperature 940 is set. In this example, the user may work during the weekdays. Accordingly, the user may not be home between the hours of 8:00 AM and 5:00 PM during weekdays. As such, the user may set the setpoint temperature 940 to 65° F. between the hours of 8:00 AM and 5:00 PM on the weekdays. In some cases, the weekday settings screen 932 may also include a back option for moving back to the previous screen (in this case, the schedule settings functions screen 930 of FIG. 9C), a next option for moving to the next screen, and a submit option for submitting the setpoint temperature 940 for the time interval 944. This is just one example of the weekday settings screen 932 and the various features that may be presented on the weekday settings screen 932. In this case, the user may select the next option.

Figure 9E:
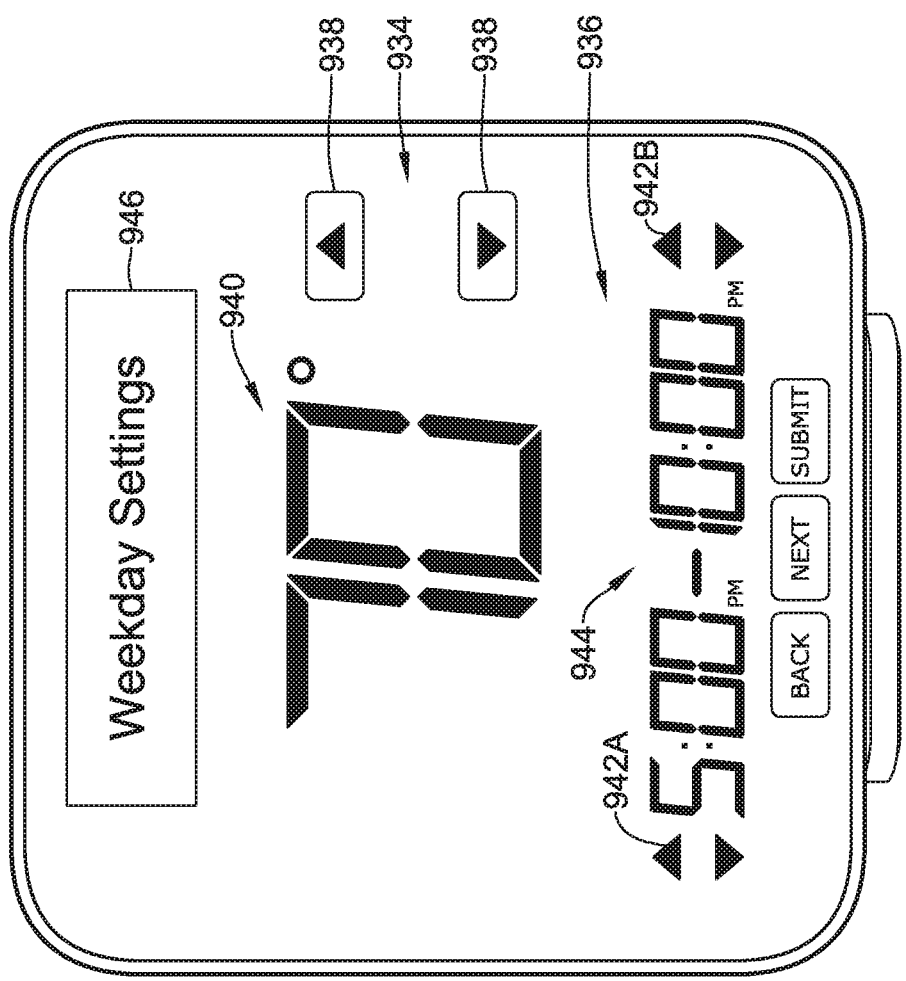

Turning to FIG. 9E, the controller 404 may then use the display 420 to present a second weekday settings screen 946. Similar to the weekday settings screen 932, the weekday settings screen 946 may also include the increment/decrement temperature arrows 938 to increase or decrease the setpoint temperature 940 and the increment/decrement time arrows 942A and 942B to change the time interval 944 for which the setpoint temperature 940 is set. In this example, the user may be home and awake on the weekdays between the hours of 5:00 PM and 10:00 PM. As such, the user may turn the setpoint temperature 940 up to 70° F. between the hours of 5:00 PM and 10:00 PM. In this case, the user may then select the next option.

Figure 9F:
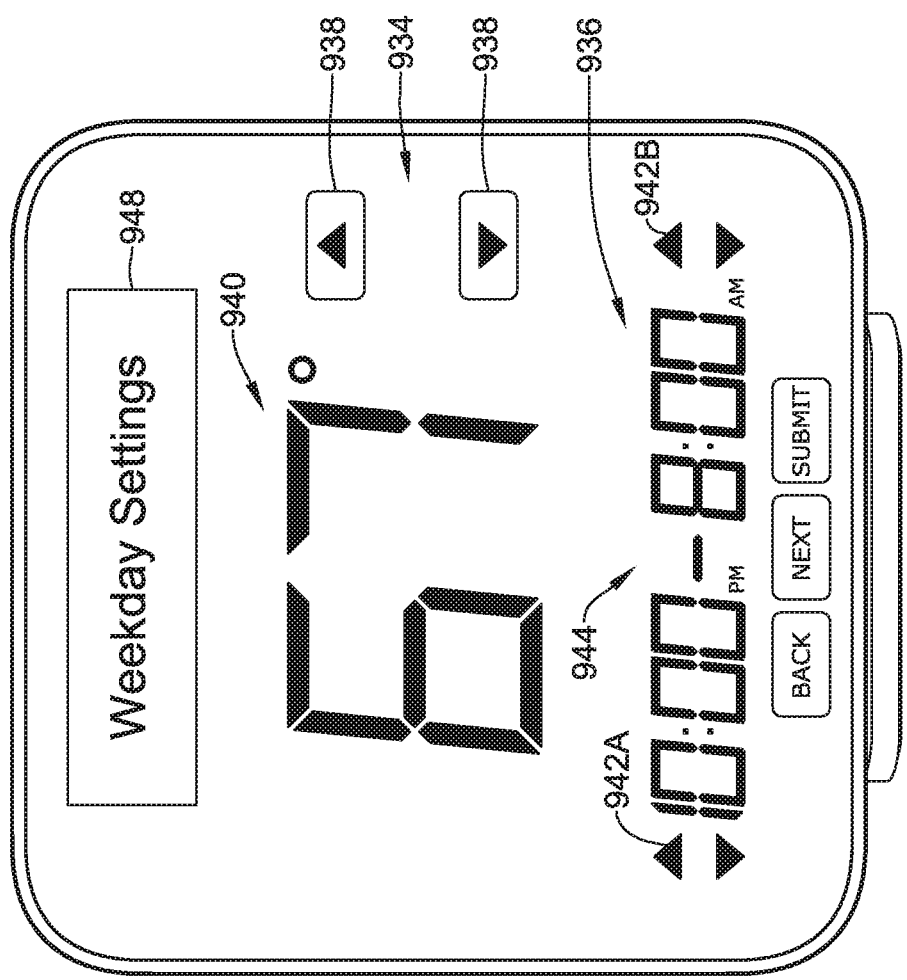

Turning to FIG. 9F, the controller 404 may then use the display 420 to present a third weekday settings screen 948. Similar to the weekday settings screens 932 and 946, the weekday settings screen 948 may also include the increment/decrement temperature arrows 938 to increase or decrease the setpoint temperature 940 and the increment/decrement time arrows 942A and 942B to change the time interval 944 for which the setpoint temperature 940 is set. In this example, the user may be home and asleep on the weekdays between the hours of 10:00 PM and 8:00 AM. As such, the user may turn the setpoint temperature 940 down to 67° F. between the hours of 10:00 PM and 8:00 AM. In this case, the user may then select the submit option.

Figure 9G:
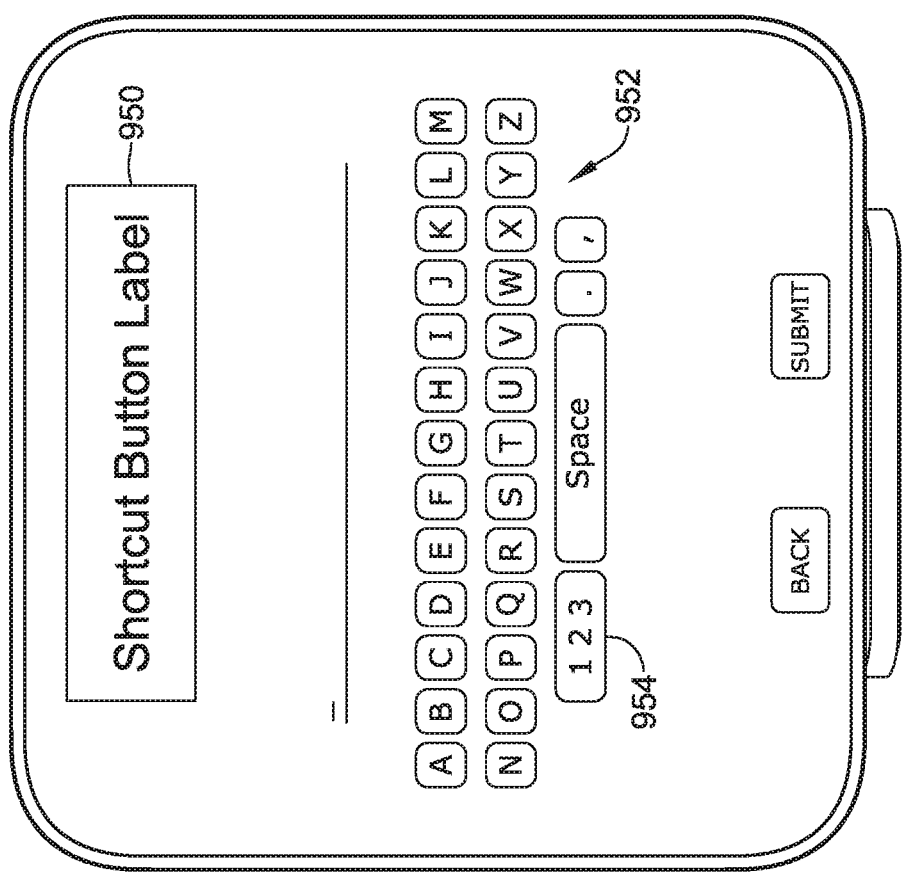

Turning to FIG. 9G, the controller 404 may then use the display 420 to present a shortcut button label screen 950. In some cases, the shortcut button label screen 950 may include an alphabet keypad 952 that the user can use to label the shortcut button. In some cases, the alphabet keypad 942 may include a numeric button option 954 that the user can select to bring up a numerical keypad (not shown). This is just one example of the shortcut button label screen 950 and the various features that may be presented on the shortcut button label screen 950. In this case, once the user has selected a label for the shortcut button, the user may select the submit option and the controller 404 may assign the weekdays scheduling option functions and the label to the shortcut button.

Figure 9H:
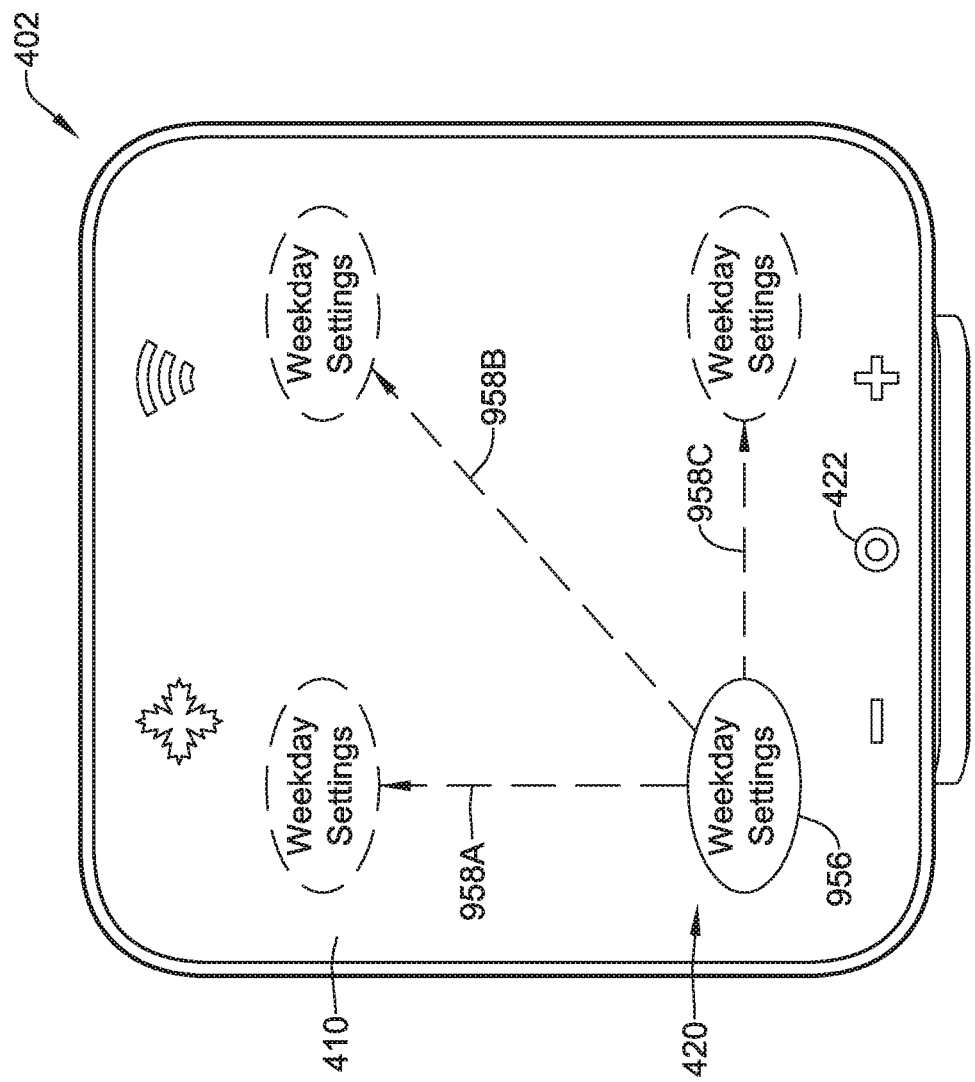

Turning to FIG. 9H, the controller 404 may then use the display 420 to present a shortcut button 956 on the user interface 410. As shown, in this example, the user has labeled the shortcut button 956 "WEEKDAY SETTINGS". In this case the label "WEEKDAY SETTINGS" appears on the shortcut button 956. In other embodiments, the label may appear by or adjacent the shortcut button 956. For example, in some cases, the shortcut button 956 may be an electromechanical button spaced from the display 420 and positioned immediately adjacent to the display 420. The label may appear on the display 420 adjacent to the electromechanical shortcut button (e.g. soft key). In addition, in some cases, as shown by arrows 958A-958C, the controller 404 may be configured to allow the user to move the shortcut button 956 to different locations on the display 420, if desired.

According to various embodiments, when the shortcut button 956 is subsequently activated, the controller 404 may instruct the transmitter 408 to send IR command signals to the IR receiver 418 of the HVAC unit 100 to set the desired setpoint temperatures at the designated times based on the assigned weekdays scheduling option functions. Furthermore, in this case, the controller 404 may automatically set the setpoint temperatures of 65° F., 70° F., and 67° F. to their updated control setpoint temperatures of 66° F., 71° F., and 68° F. As such, the transmitter may send IR command signals, in accordance with an appropriate IR protocol, to the IR receiver 418 of the HVAC unit 100 to set the setpoint temperatures at 66° F. between the hours of 8:00 AM and 5:00 PM, 71° F. between the hours of 5:00 PM and 10:00 PM, and 68° F. between the hours of 10:00 PM and 8:00 AM.

In some cases, the user may once again select the main menu button 422. As shown in FIG. 5B, after the user selects the main menu button 422, the controller 404 may once again use the display 420 to present the main menu screen 500. The user may then select the shortcut button setup option 508. Referring tack to FIG. 9A, after the shortcut button setup option 508 is selected, the controller 404 may once again use the display 420 to present a shortcut button menu screen 900 and the user may select the create a new shortcut button option 902. Turning to FIG. 9B, the controller 404 may then use the display 420 to present a shortcut button definition options screen 910 and the user may select the device information option 928.

Figure 9I:
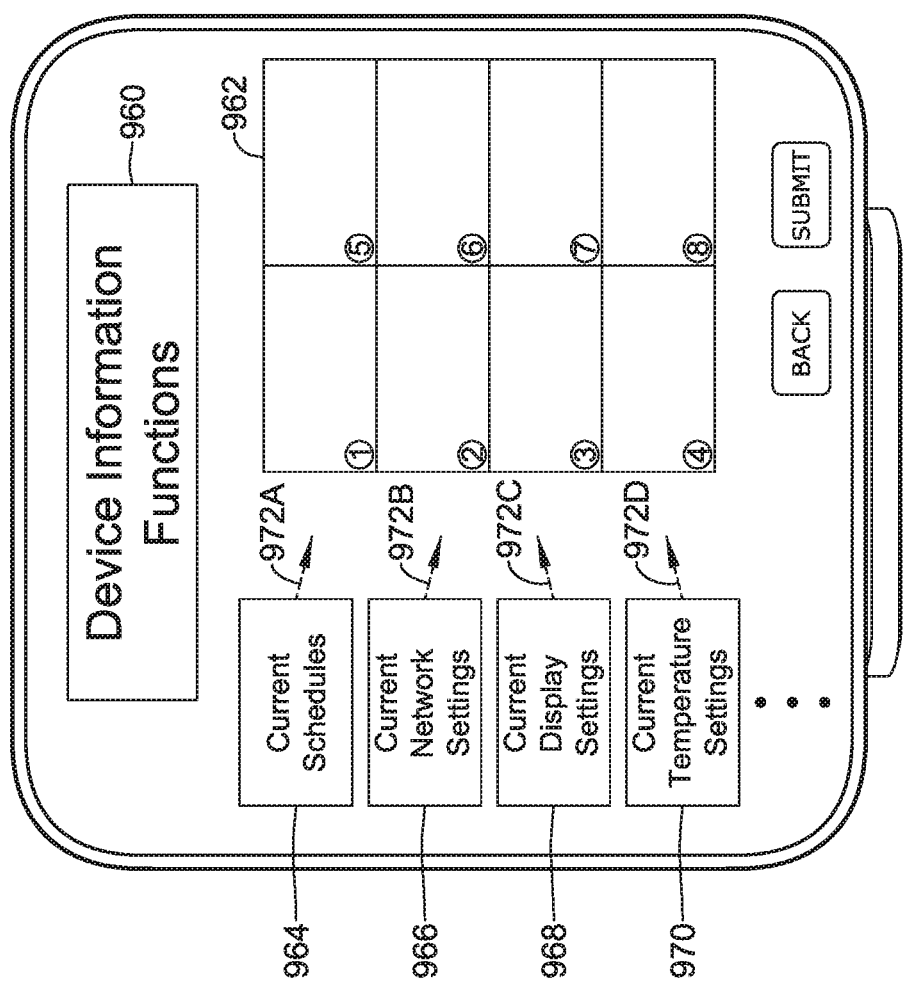

Turning to FIG. 9I, the controller 404 may then use the display 420 to present a device information functions screen 960. In some cases, the device information functions screen 960 may include current schedules information 964, current network settings information 966, current display settings information 968, and current temperature settings 970. In some cases, the device information functions screen 960 may also include a priority table 962 that may be used to specify an order at which the selected functions are presented on the display 420. As shown by arrows 972A-972D, the controller 404 may be configured to allow the user to move the functions 964-970 into the priority table 962. This is just one example of the device information functions screen 960 and the various device information functions that may be presented on the device information functions screen 960.

Figure 9J:
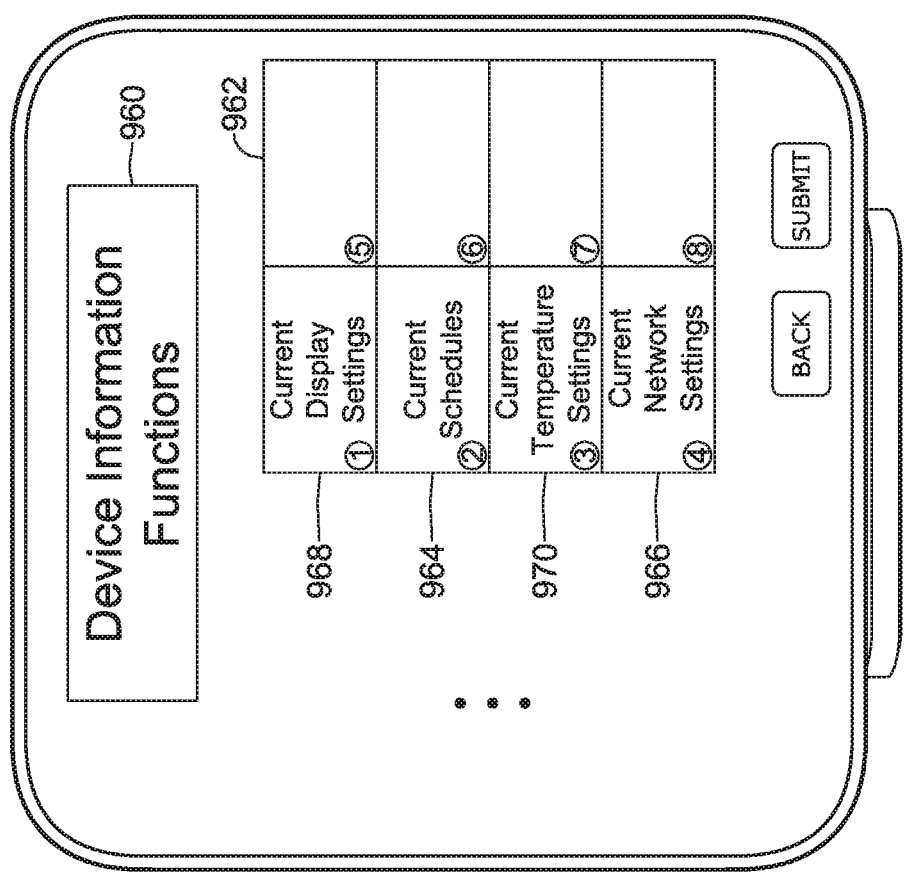

Turning to FIG. 9J, the current display settings information 968 has been placed in the first cell of the priority table 962, the current schedules information 964 has been placed in the second cell of the priority table 962, the current temperature settings 970 has been placed in the third cell of the priority table 962, and the current display settings information 968 has been placed in the fourth cell of the priority table 962. This is just one example of how the device information functions 964-970 may be prioritized. In other cases, there may not be a priority table and the controller 404 may be configured to prioritize functions in a different manner. In this case, the user may then select the submit option. Turning back to FIG. 9G, the controller 404 may once again use the display 420 to present a shortcut button label screen 950. Once the user has selected a label for the shortcut button, the user may select the submit option and the controller 404 may assign the device information functions and the label to the shortcut button.

Turning to FIG. 9K, the controller 404 may then use the display 420 to present a shortcut button 974 on the user interface 410. As shown, in this example, the user has labeled the shortcut button 974 "WIRELESS CONTROLLER STATUS". In this case the label "WIRELESS CONTROLLER STATUS" appears on the shortcut button 974. In addition, in some cases, as shown by arrows 976A-976B, the controller 404 may be configured to allow the user to move the shortcut button 976 to different locations on the display 420. This is just one example of how the controller 404 may use the display 420 to present the shortcut buttons 956 and 974. In other embodiments, the shortcut buttons 956 and 974 may be presented in a different manner.

According to various embodiments, when the shortcut button 974 is subsequently activated, the controller 404 may use the display 420 to present the device information functions 964-970 based on the order specified by the priority table 962 (i.e., the cell of the priority table 962 that each of the device information functions 964-970 occupies). In this case, the current display settings information 968 may be displayed first, the current schedules information 964 may be displayed second, the current temperature settings information 970 may be displayed third, and the current display settings information 968 may be displayed fourth. Similarly, other functions that the controller 404 may control, such as operating functions of the HVAC unit 100 may be assigned an order or sequence of operation and the controller 404 may instruct the transmitter 408 to send IR command signals to the IR receiver 418 of the HVAC unit 100 to carry out the functions assigned to the shortcut button (e.g., shortcut buttons 956 and 974) according to the specified order.

Figure 10:
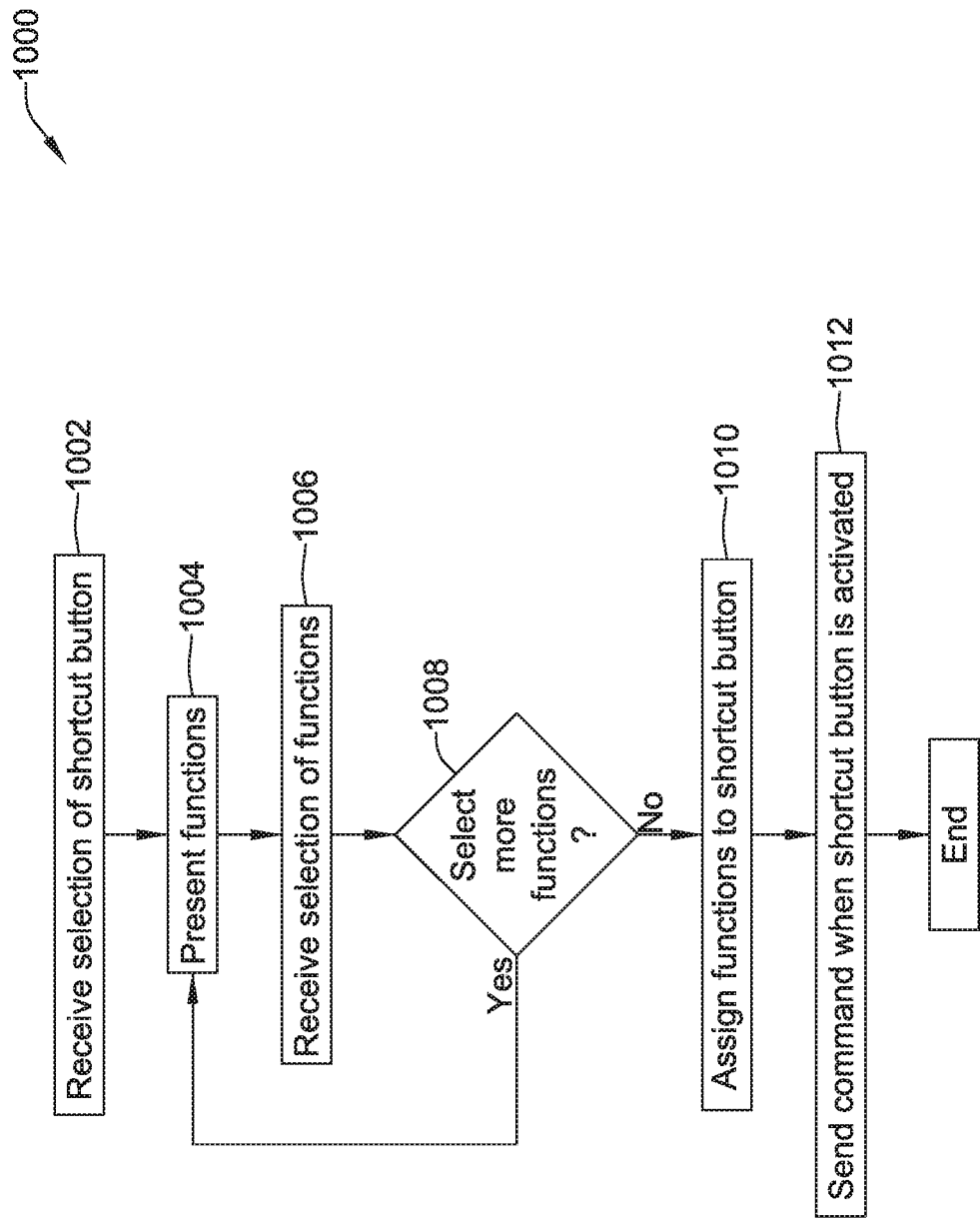
FIG. 10 is a flow diagram of an illustrative method for assigning functions to a shortcut button of a wireless controller.

FIG. 10 shows an illustrative method 1000 for operating a wireless controller 402 configured to send commands to a mini-split HVAC unit 100 that includes an IR receiver, and the mini-split HVAC unit 100 may be configured to thermostatically control the temperature in a space based at least in part on the temperature sensed by a temperature sensor associated with the mini-split HVAC unit 100 in conjunction with a programmable setpoint. The method 1000 may begin at step 1002, where the wireless controller 402 may receive a selection of a shortcut button definition option. In some examples, the shortcut button may be a physical button (e.g., an electromechanical button) on a user interface of the wireless controller and the wireless controller receives selection of the shortcut button definition option by activation of the shortcut button. In some examples, a touchscreen display may be included on the user interface and the shortcut button may be created and/or updated and the wireless controller receives selection of the shortcut button definition option from an options menu presented by the display.

At step 1004, and after receiving selection of the shortcut button definition option, the wireless controller 402 may use the display to present menu screens that allow a user to select functions from predefined functions that can be assigned to the shortcut button. In some examples, the menu screens presented may also allow the user to specify an order of sequence that the selected functions should be executed. At step 1006, the wireless controller 402 may receive a selection of functions to assign to the shortcut button. At step 1008, the wireless controller 402 may determine whether the user would like to select more functions to assign to the shortcut button. In some examples, the wireless controller 402 may use the display to present a select more functions option or a next option to allow the user to select more functions, if desired. In some examples, the wireless controller 402 may use the display to present a submit option or a finished option to indicate that the user is done selecting functions.

If the wireless controller 402 determines that the user would like to select more functions to assign to the shortcut button, at step 1004, the wireless controller 402 may use the display to present more functions. If the wireless controller 402 determines that the user is done selecting functions, at step 1010, the wireless controller 402 may assign the selected functions to the shortcut button. The shortcut button is then active.

At step 1012, when the shortcut button is subsequently activated by a user, the wireless controller 402 may send or transmit commands to the mini-split HVAC unit 100, and in response the mini-split HVAC unit 100 may carry out the selected and assigned functions. In some examples, the mini-split HVAC unit 100 may also carry out the selected and signed functions in an order or sequence specified by the user.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Also, in the above Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description as examples or embodiments, with each claim standing on its own as a separate embodiment, and it is contemplated that such embodiments can be combined with each other in various combinations or permutations.

What is claimed is:

1. A wireless controller configured to set a programmable setpoint of a remote HVAC unit, wherein the remote HVAC unit is configured to thermostatically control a temperature in a space based at least in part on a temperature sensed by a local temperature sensor of the remote HVAC unit and the programmable setpoint, the wireless controller comprising:
   a transmitter configured to wirelessly transmit one or more commands to set the programmable setpoint of the remote HVAC unit;
   a memory for storing a desired setpoint temperature;
   a temperature sensor for sensing a temperature at the wireless controller;
   a controller operatively coupled to the transmitter, the temperature sensor, and the memory, the controller configured to:
   transmit one or more commands via the transmitter to set the programmable setpoint of the remote HVAC unit to the desired setpoint temperature;
   wait until the temperature sensed by the temperature sensor of the wireless controller stabilizes at a stabilized temperature;
   determine a difference between the desired setpoint temperature and the stabilized temperature, resulting in an offset temperature;
   if the offset temperature is greater than or equal to a threshold offset, then:
   determine an updated control setpoint temperature based on the offset temperature and the desired setpoint temperature; and
   transmit one or more commands to set the programmable setpoint of the remote HVAC unit to the updated control setpoint temperature.

2. The wireless controller of claim 1, wherein the controller is configured to determine the updated control setpoint temperature by adding the offset temperature to the desired setpoint temperature.

3. The wireless controller of claim 1, wherein the controller is configured to determine that the temperature sensed by the temperature sensor of the wireless controller has stabilized by determining when a change rate in the temperature sensed by the temperature sensor of the wireless controller falls below a change rate threshold.

4. The wireless controller of claim 1 further comprising a user interface including a display, wherein the controller is configure to display on the display the desired setpoint temperature even after the controller transmits one or more commands to set the programmable setpoint of the remote HVAC unit to the updated control setpoint temperature.

5. The wireless controller of claim 1 further comprising a user interface including a display, wherein a user can enter and/or change the desired setpoint temperature via the user interface.

6. The wireless controller of claim 1, wherein the controller is configured to wait at least a sample period before the controller is configured to again:
    wait until the temperature sensed by the temperature sensor of the wireless controller stabilizes at a stabilized temperature;
    determine a difference between the desired setpoint temperature and the stabilized temperature, resulting in an offset temperature;
    if the offset temperature is greater than or equal to a threshold offset, then:
    determine an updated control setpoint temperature based on the offset temperature and the desired setpoint temperature; and
    transmit one or more commands to set the programmable setpoint of the remote HVAC unit to the updated control setpoint temperature.

7. The wireless controller of claim 6, wherein the sample period is at least 10 minutes.

8. The wireless controller of claim 6, wherein the sample period is at least 30 minutes.

9. The wireless controller of claim 1, wherein after the controller transmits one or more commands to set the programmable setpoint of the remote HVAC unit to the updated control setpoint temperature, the controller is further configured to:
    wait until the temperature sensed by the temperature sensor of the wireless controller stabilizes at a new stabilized temperature;
    determine a difference between the desired setpoint temperature and the new stabilized temperature, resulting in a new offset temperature;
    if the new offset temperature is greater than or equal to the threshold offset, then:
    determine an updated control setpoint temperature by adding the new offset temperature to the previous updated control setpoint temperature; and
    transmit one or more commands to set the programmable setpoint of the remote HVAC unit to the updated control setpoint temperature.

10. The wireless controller of claim 1, wherein the remote HVAC unit comprises a mini-split HVAC unit that includes an infra-red (IR) receiver that is configured to receive one or more commands to set the programmable setpoint of the mini-split HVAC unit, and wherein the transmitter of the wireless controller includes an IR transmitter for transmitting one or more commands to set the programmable setpoint of the mini-split HVAC unit.

11. The wireless controller of claim 1, wherein the memory stores a programmable schedule that includes a plurality of desired setpoint temperatures each associated with a corresponding time, wherein the controller is configured to transmit one or more commands to set the programmable setpoint of the remote HVAC unit to each of the desired setpoint temperatures plus the offset temperature at the corresponding times.

12. A wireless temperature controller configured to set a programmable setpoint of a mini-split HVAC unit that includes an infra-red (IR) receiver that is configured to receive one or more commands to set the programmable setpoint of the mini-split HVAC unit, and wherein the mini-split HVAC unit is configured to thermostatically control a temperature in a space based at least in part on a temperature sensed by a temperature sensor associated with the mini-split HVAC unit and the programmable setpoint, the wireless temperature controller comprising:
    an IR transmitter configured to wirelessly transmit one or more commands to set the programmable setpoint of the mini-split HVAC unit;
    a memory for storing a desired setpoint temperature;
    a temperature sensor for sensing a temperature at the wireless temperature controller;
    a controller operatively coupled to the IR transmitter, the temperature sensor, and the memory, the controller configured to:
    transmit one or more commands via the IR transmitter to set the programmable setpoint of the mini-split HVAC unit to the desired setpoint temperature;
    wait until the temperature sensed by the temperature sensor of the wireless temperature controller stabilizes at a stabilized temperature;
    determine a difference between the desired setpoint temperature and the stabilized temperature, resulting in an offset temperature;
    determine an updated control setpoint temperature based on the offset temperature and the desired setpoint temperature; and
    transmit one or more commands via the IR transmitter to set the programmable setpoint of the mini-split HVAC unit to the updated control setpoint temperature.

13. The wireless temperature controller of claim 12, wherein the controller is further configured to determine if the offset temperature is greater than or equal to a threshold offset, and if not, skipping:
    determine the updated control setpoint temperature based on the offset temperature and the desired setpoint temperature; and
    transmit one or more commands via the IR transmitter to set the programmable setpoint of the mini-split HVAC unit to the updated control setpoint temperature.

14. The wireless temperature controller of claim 12, wherein the controller is configured to wait at least a sample period before the controller is configured to again:
    wait until the temperature sensed by the temperature sensor of the wireless temperature controller stabilizes at a stabilized temperature;
    determine a difference between the desired setpoint temperature and the stabilized temperature, resulting in an offset temperature;
    determine an updated control setpoint temperature based on the offset temperature and the desired setpoint temperature; and
    transmit one or more commands via the IR transmitter to set the programmable setpoint of the mini-split HVAC unit to the updated control setpoint temperature.

15. The wireless temperature controller of claim 14, wherein the sample period is at least 20 minutes.

16. A method for controlling a mini-split HVAC unit from a remote location, wherein the mini-split HVAC unit is configured to wireless receive one or more commands to set a programmable setpoint of the mini-split HVAC unit, and is further configured to thermostatically control a temperature in a space based at least in part on a temperature sensed by a local temperature sensor of the mini-split HVAC unit and the programmable setpoint, the method comprising:

- sending one or more commands from the remote location to set the programmable setpoint of the mini-split HVAC unit to a desired setpoint temperature;
- sensing a temperature at the remote location;
- waiting until the temperature sensed at the remote location stabilizes at a stabilized temperature;
- determining a difference between the desired setpoint temperature and the stabilized temperature, resulting in an offset temperature;
- determining an updated control setpoint temperature based on the offset temperature and the desired setpoint temperature; and
- sending one or more commands from the remote location to set the programmable setpoint of the mini-split HVAC unit to the updated control setpoint temperature.

17. The method of claim 16, further comprising:

- determining if the offset temperature is greater than or equal to a threshold offset, and if not, skipping:
  - determining the updated control setpoint temperature based on the offset temperature and the desired setpoint temperature; and
  - sending one or more commands to set the programmable setpoint of the mini-split HVAC unit to the updated control setpoint temperature.

18. The method of claim 16, further comprising waiting at least a sample period, and then:

- waiting until the temperature sensed at the remote location stabilizes at a stabilized temperature;
- determining a difference between the desired setpoint temperature and the stabilized temperature, resulting in an offset temperature;
- determining an updated control setpoint temperature based on the offset temperature and the desired setpoint temperature; and
- sending one or more commands from the remote location to set the programmable setpoint of the mini-split HVAC unit to the updated control setpoint temperature.

19. The method of claim 18, wherein the sample period is at least 20 minutes.

20. The method of claim 16, wherein the steps are performed by a wireless temperature controller located at the remote location.

* * * * *